(12) United States Patent
Onda

(10) Patent No.: US 8,155,875 B2
(45) Date of Patent: Apr. 10, 2012

(54) METHOD OF DETERMINING APPROPRIATENESS OF SATELLITE ORBIT MODELING, METHOD OF PROVIDING LONG-TERM PREDICTED ORBIT DATA, AND DEVICE FOR DETERMINING APPROPRIATENESS OF SATELLITE ORBIT MODELING

(75) Inventor: Kenji Onda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 422 days.

(21) Appl. No.: 12/553,329

(22) Filed: Sep. 3, 2009

(65) Prior Publication Data

US 2010/0060516 A1   Mar. 11, 2010

(30) Foreign Application Priority Data

Sep. 5, 2008 (JP) ................................ 2008-228006

(51) Int. Cl.
   *G01C 21/00* (2006.01)
(52) U.S. Cl. ............ 701/226; 701/12; 701/13; 701/213; 701/214; 342/357.66; 342/357.64; 224/158.1; 224/173.3
(58) Field of Classification Search ............... 701/226, 701/12–13, 213–214; 244/158.1–173; 342/357.64, 342/357.02, 357.25, 357.43, 357.62, 357.63
   See application file for complete search history.

(56) References Cited

U.S. PATENT DOCUMENTS

| | | | | |
|---|---|---|---|---|
| 5,666,122 A | * | 9/1997 | Carter | 342/357.65 |
| 5,757,317 A | * | 5/1998 | Buchler et al. | 342/357.31 |
| 5,831,575 A | * | 11/1998 | Gu | 342/357.31 |
| 7,095,368 B1 | * | 8/2006 | van Diggelen | 342/357.62 |
| 7,365,679 B2 | * | 4/2008 | Murakami | 342/357.68 |
| 7,460,870 B2 | * | 12/2008 | Moeglein et al. | 455/456.1 |

(Continued)

FOREIGN PATENT DOCUMENTS

DE   195 08 208.7   *   3/1995

(Continued)

OTHER PUBLICATIONS

RAIM with Optimal Integrity and Continuity Allocations Under Multiple Failures; Blanch, Juan; Walter, Todd; Enge, Per; Aerospace and Electronic Systems, IEEE Transactions on; vol. 46 , Issue: 3; Digital Object Identifier: 10.1109/TAES.2010.5545186; Publication Year: 2010 , pp. 1235-1247.*

(Continued)

*Primary Examiner* — Cuong H Nguyen
(74) *Attorney, Agent, or Firm* — Global IP Counselors, LLP

(57) ABSTRACT

A method of determining the appropriateness of satellite orbit modeling is provided. The method includes calculating values of parameters, that the predetermined model has, on the basis of predicted position data including a first predicted position at a first point of time and a second predicted position at a second point of time of a positioning satellite in time series, calculating a first and a second calculated positions of the positioning satellite derived from the predetermined model by using the values of the parameters; and determining the appropriateness of the predetermined model using the values of the parameters, on the basis of first difference between the first predicted position and the first calculated position, and seconded difference between the second predicted position and the second calculated position. The predetermined model is used when approximating a satellite orbit of the poisoning satellite.

8 Claims, 16 Drawing Sheets

U.S. PATENT DOCUMENTS

| | | | |
|---|---|---|---|
| 7,489,269 B2 * | 2/2009 | van Diggelen et al. | 342/357.67 |
| 7,548,200 B2 | 6/2009 | Garin | |
| 7,576,690 B2 * | 8/2009 | Vollath | 342/357.24 |
| 7,623,871 B2 * | 11/2009 | Sheynblat | 455/456.1 |
| 7,877,173 B2 * | 1/2011 | Liu et al. | 701/13 |
| 7,932,859 B2 * | 4/2011 | Baddini Mantovani | 342/357.73 |
| 2004/0002344 A1 * | 1/2004 | Moeglein et al. | 455/456.1 |
| 2004/0080454 A1 * | 4/2004 | Camp, Jr. | 342/464 |
| 2006/0224317 A1 | 10/2006 | Sarkar | |
| 2007/0159384 A1 | 7/2007 | Kangas | |
| 2007/0262898 A1 * | 11/2007 | Murakami | 342/357.02 |
| 2008/0169976 A1 * | 7/2008 | Murakami | 342/357.02 |
| 2009/0009386 A1 * | 1/2009 | van Diggelen et al. | 342/357.01 |
| 2009/0012662 A1 * | 1/2009 | Liu et al. | 701/13 |
| 2009/0091493 A1 * | 4/2009 | Hwang et al. | 342/357.02 |
| 2009/0109090 A1 * | 4/2009 | Vollath | 342/357.12 |
| 2009/0177382 A1 * | 7/2009 | Alles et al. | 701/208 |
| 2010/0018518 A1 * | 1/2010 | McDonald | 126/572 |
| 2010/0018519 A1 * | 1/2010 | McDonald et al. | 126/573 |

FOREIGN PATENT DOCUMENTS

| | | | |
|---|---|---|---|
| JP | 2005-362045 | * | 12/2005 |
| JP | 2006-525505 A | | 11/2006 |
| JP | 2007-151713 | * | 6/2007 |
| JP | 2007-523345 A | | 8/2007 |
| JP | 2007-292763 A | | 11/2007 |
| KR | 10-2004-0089458 | * | 11/2004 |
| WO | WO95/27909 | * | 10/1995 |
| WO | WO-2006/031652 A | | 3/2006 |

OTHER PUBLICATIONS

Research of error correction of LEO satellite orbit prediction for vehicle-borne tracking and position device; Pei-lu Zhang; Li-hong Guoguo; Jian-jun Wang; Computer, Mechatronics, Control and Electronic Engineering (CMCE), 2010 Inter. Conf. on; vol. 3; Digital Object Identifier: 10.1109/CMCE.2010.5610389; Publication Year: 2010,,p. 56-60.*

Experimental assessment of a PPP-based P2-C2 bias estimation; Santos, M.C.; van der Bree, R.; van der Marel, H.; Verhagen, S.; Garcia, C.A.; Satellite Navigation Technologies and European Workshop on GNSS Signals and Signal Processing (NAVITEC), 2010 5th ESA Workshop on; Digital Object Identifier: 10.1109/NAVITEC.2010.5708025; pp. 1-4.*

Satellite orbit determination and power subsystem design; Chouraqui, S.; Bekhti, M.; Underwood, C.I.; Geoscience and Remote Sensing Symposium, 2003. IGARSS '03. Proceedings. 2003 IEEE Inter.; vol. 7; Digital Object Identifier: 10.1109/IGARSS.2003.1295590; Publication Year: 2003 , pp. 4590-4592 vol. 7.*

* cited by examiner

× PREDICTED POSITION

× PREDICTED POSITION

| DATE AND TIME \ SATELLITE | SV1 | SV2 | SV3 | ... |
|---|---|---|---|---|
| 2008 7/1 0:00 | (X11,Y11,Z11) | (X12,Y12,Z12) | (X13,Y13,Z13) | ... |
| 2008 7/1 0:15 | (X21,Y21,Z21) | (X22,Y22,Z22) | (X23,Y23,Z23) | ... |
| 2008 7/1 0:30 | (X31,Y31,Z31) | (X32,Y32,Z32) | (X33,Y33,Z33) | ... |
| ⋮ | ⋮ | ⋮ | ⋮ | ⋮ |
| 2008 7/7 24:00 | (Xt1,Yt1,Zt1) | (Xt2,Yt2,Zt2) | (Xt3,Yt3,Zt3) | ... |

US 8,155,875 B2

METHOD OF DETERMINING APPROPRIATENESS OF SATELLITE ORBIT MODELING, METHOD OF PROVIDING LONG-TERM PREDICTED ORBIT DATA, AND DEVICE FOR DETERMINING APPROPRIATENESS OF SATELLITE ORBIT MODELING

CROSS-REFERENCE TO THE RELATED APPLICATIONS

This application claims priority to Japanese Patent Application No. 2008-228006 filed on Sep. 5, 2008. The entire disclosure of Japanese Patent Application No. 2008-228006 is hereby incorporated herein by reference.

BACKGROUND

1. Technical Field

The present invention relates to a method of determining the appropriateness of satellite orbit modeling, a method of providing long-term predicted orbit data, and a device for determining the appropriateness of satellite orbit modeling.

2. Related Art

A GPS (global positioning system) is widely known as a positioning system using a positioning signal and is used for a positioning device built in a mobile phone, a car navigation apparatus, or the like. The GPS measures the position by executing a positioning operation for calculating four parameter values of three-dimensional coordinate values, which indicate the position of a GPS positioning device, and a time error on the basis of the information, such as the positions of a plurality of GPS satellites or a pseudo distance from each GPS satellite to the GPS positioning device.

In positioning using the GPS, satellite information including the position, speed, and moving direction of the GPS satellite is calculated on the basis of the navigation data, which are called the almanac or ephemeris, and are superimposed on the GPS satellite signals transmitted from the GPS satellite and the positioning operation is performed using the satellite information and time information. In particular, the ephemeris serves as an important key when acquiring the satellite. Accordingly, for example, when positioning starts in a state where the ephemeris is not stored, the time to first fix (TTFF) is increased. In addition, even if it is not a first positioning, the acquisition time changes a lot according to whether or not the ephemeris of the satellite is stored when acquiring a certain satellite for the first time.

For this reason, International Publication No. 2006/031652 pamphlet discloses the technique in which the server in the server-client system predicts the ephemeris for a long period of time of one week and provides the predicted ephemeris (hereinafter, referred to as the long-term prediction ephemeris (long-term predicted orbit data)) to the positioning device which is the client.

A method of defining the long-term prediction ephemeris in the same data format as the normal ephemeris may be considered as a method of defining a long-term prediction ephemeris. It is a method in which the satellite orbit is approximated using the Kepler's elliptical orbit model, which is one of the approximate models of the satellite orbit, and the long-term prediction ephemeris is defined by a parameter value (hereinafter, referred to as a satellite orbit parameter) of the model at that time. The satellite prediction calendar (predicted position data) including the predicted positions, which are obtained by predicting the future positions of the positioning satellite in time series at predetermined intervals, is provided from a predetermined commercial system. The approximate calculation based on the Kepler's elliptical orbit mode However, in the predicted positions stored in the satellite prediction calendar, the predicted position which is extremely (several kilometers) distant from an adjacent predicted position in positional relationship with the adjacent predicted position may be included as a so-called abnormal value. Ideal approximation of the satellite orbit is the elliptical orbit in which all predicted positions are correctly reproduced. However, when the abnormal value is included, the elliptical shape is distorted due to the abnormal value. In the case of a distorted satellite orbit, it is natural that the reproducibility of the predicted position is not good.

SUMMARY

An advantage of some aspects of the invention is that it provides a method of determining the appropriateness of modeling of the satellite orbit obtained by approximation of the future orbit of a positioning satellite.

A first aspect of the invention is directed to a method of determining the appropriateness of satellite orbit modeling which uses a predetermined model. The method includes: calculating values of the parameters, that a predetermined model has, on the basis of the predicted position data including predicted positions of the positioning satellite in time series, calculating calculated positions of the positioning satellite derived from the predetermined model using the values of the parameters, and determining the appropriateness of the predetermined model using the values of the parameters of the satellite orbit, on the basis of the differences between the predicted positions and the calculated positions. The predetermined model is used when approximating the satellite orbit of the positioning satellite.

As another aspect of the invention, there may be configured a device for determining the appropriateness of satellite orbit modeling. The device includes a parameter value calculating unit being configured to calculate values of parameters, that a predetermined model has, on the basis of the predicted position data including predicted positions of the positioning satellite in time series, a calculated position calculating unit being configured to calculate calculated positions of the positioning satellite derived from the model using the values of the parameters, and a determination unit being configured to determine the appropriateness of the predetermined model of the satellite orbit by using the values of the parameters, on the basis of the differences between the predicted positions and the calculated positions. The predetermined model is used when approximating a satellite orbit of the positioning satellite.

According to the first aspect and the like of the invention, the values of the parameters that the predetermined model has are calculated on the basis of the predicted position data of the positioning satellite. In addition, the calculated positions of the positioning satellite derived from the model are calculated using the calculated values of the parameters, and the appropriateness of modeling of the satellite orbit by the model using the values of the parameters is determined on the basis of the differences between the predicted positions and the calculated positions.

If modeling of the satellite orbit is appropriate, the difference between the predicted position of the positioning satellite included in the predicted position data and the calculated position of the positioning satellite derived from the model should become small. Thus, it becomes possible to determine the appropriateness of modeling of the satellite orbit by using the difference between the predicted position and the calculated position as the basis for determination.

A second aspect of the invention is directed to the method of determining the appropriateness of satellite orbit modeling according to the first aspect of the present invention, wherein the predetermined model is a function to obtain a position by inputting time, the calculating the calculated positions includes calculating the calculated positions at the same time as predicted positions, and the determining the appropriateness of the modeling includes determining the appropriateness of the modeling on the basis of the distances (or differences) between the predicted positions and the calculated positions.

According to the second aspect of the invention, the calculated positions are calculated at the same time as the predicted positions, and the appropriateness of the modeling is determined on the basis of the distances between the predicted positions and the calculated positions. If modeling of the satellite orbit is appropriate, the distance between the predicted position and the calculated position of the positioning satellite at the same time should be decreased. Therefore, determination on whether or not modeling of the satellite orbit is appropriate can be effectively realized by performing threshold value determination on sum of the distance calculated at each time.

A third aspect of the invention is directed to the method of determining the appropriateness of satellite orbit modeling according to the second aspect of the present invention, wherein the method further includes selecting the predicted position if the predicted position is within a predetermined distance from the calculated position at the same time as the predicted position, calculating the values of the parameters on the basis of the predetermined position after being selected, calculating the calculated positions on the basis of the predetermined position after being selected, and determining the appropriateness of the modeling again on the basis of on the basis of the predetermined position after being selected.

According to the third aspect of the invention, the predicted position within the predetermined distance from the calculated position at the same time as the predicted position is selected. In addition, calculation of the values of the parameters, calculation of the calculated positions, and determination on the appropriateness of the modeling are performed again on the basis of the selected predicted position. When the predicted position and the calculated position of the positioning satellite at the same time are very distant from each other, there is a high possibility that the predicted position will be an abnormal value which largely deviate from the ideal satellite orbit. Accordingly, it is preferable to perform modeling of the satellite orbit again under the condition where such an abnormal value is excluded.

A fourth aspect of the invention is directed to the method of determining the appropriateness of satellite orbit modeling according to the first aspect of the present invention, where the method further includes determining the combination of the predicted positions, which are used for the calculation of the values of the parameters, from the predicted position data, calculating of the values of the parameters on the basis of the combination, calculating the calculated positions on the basis of the combination, and determining the appropriateness of the modeling on the basis of the combination.

According to the fourth aspect of the invention, the combination of the predicted positions used for the calculation of the values of the parameters is determined. In addition, calculation of the values of the parameters, calculation of the calculated positions, and determination on the appropriateness of the modeling are performed on the basis of the combination of the determined predicted positions.

A fifth aspect of the invention is directed to the method of determining the appropriateness of satellite orbit modeling according to the fourth aspect of the present invention, where the method further includes changing the combination of the predicted positions to a second combination, which is used for the calculation of the values of the parameters, when it is determined that the modeling is not appropriate, calculating of the values of the parameters on the basis of the second combination, calculating the calculated positions on the basis of the second combination, and determining the appropriateness of the modeling again on the basis of the second combination.

According to the fifth aspect of the invention, the combination of the predicted positions used for calculation of the values of the parameters is changed to the second combination when it is determined that the modeling is not appropriate. In addition, calculation of the values of the parameters, calculation of the calculated positions, and determination on the appropriateness of the modeling are performed again on the basis of the second combination of the changed predicted positions. Thus, when it is determined that modeling of the satellite orbit is not appropriate, the appropriate values of the parameters can be acquired by changing the combination of the predicted positions to the second combination and performing the modeling again.

A sixth aspect of the invention is directed to a method of providing long-term predicted orbit data, where the method includes calculating values of the parameters on the basis of predicted position data including predetermined positions, calculating calculated positions of a positioning satellite derived from the predetermined model by using the values of the parameters, determining appropriateness of the predetermined model using the parameters for each of predetermined continuous unit periods, on the basis of differences between the predicted positions and the calculated positions, and providing long-term predicted orbit data which includes the values of the parameters of the unit periods, if the predetermined model for each of the unit periods is determined to be appropriate. The predetermined model is used when approximating a satellite orbit of the positioning satellite.

According to the sixth aspect of the invention, calculation of the values of the parameters, calculation of the calculated positions, and determination on the appropriateness of the modeling are performed for each of predetermined continuous unit periods. In addition, long-term predicted orbit data is provided, if the predetermined model for each of the unit periods is determined to be appropriate. As a result, it becomes possible to provide to the positioning device with only the values of the parameters of the unit period in which modeling was performed appropriately. A seventh aspect of the invention is directed to a method of providing long-term predicted orbit data, where the method includes calculating values of the parameters on the basis of predicted position data including predetermined positions, calculating calculated positions of a positioning satellite derived from the predetermined model by using the values of the parameters, determining appropriateness of the predetermined model using the parameters for predetermined continuous unit periods, on the basis of differences between the predicted positions and the calculated positions, and providing long-term predicted orbit data which includes the values of the parameters of the unit periods, if the predetermined model for each of the unit periods is determined to be appropriate. The predetermined model is used when approximating a satellite orbit of the positioning satellite.

According to the seventh aspect of the invention, calculation of the values of the parameters, calculation of the calculated positions, and determination on the appropriateness of the modeling are performed for predetermined continuous unit periods. In addition, long-term predicted orbit data is provided, if the predetermined model for the unit periods is determined to be appropriate. By providing the values of the parameters of the plurality of unit periods so as to match the determination result of the appropriateness of the modeling for the corresponding unit period, the positioning device can determine the unit period in which modeling was performed appropriately. In addition, for the unit period in which modeling was not performed appropriately, it is possible to avoid using the values of the parameters of the unit period for positioning.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described with reference to the accompanying drawings. However, an embodiment to which the invention can be applied is not limited to the embodiment.

1. System Configuration

Figure 1:
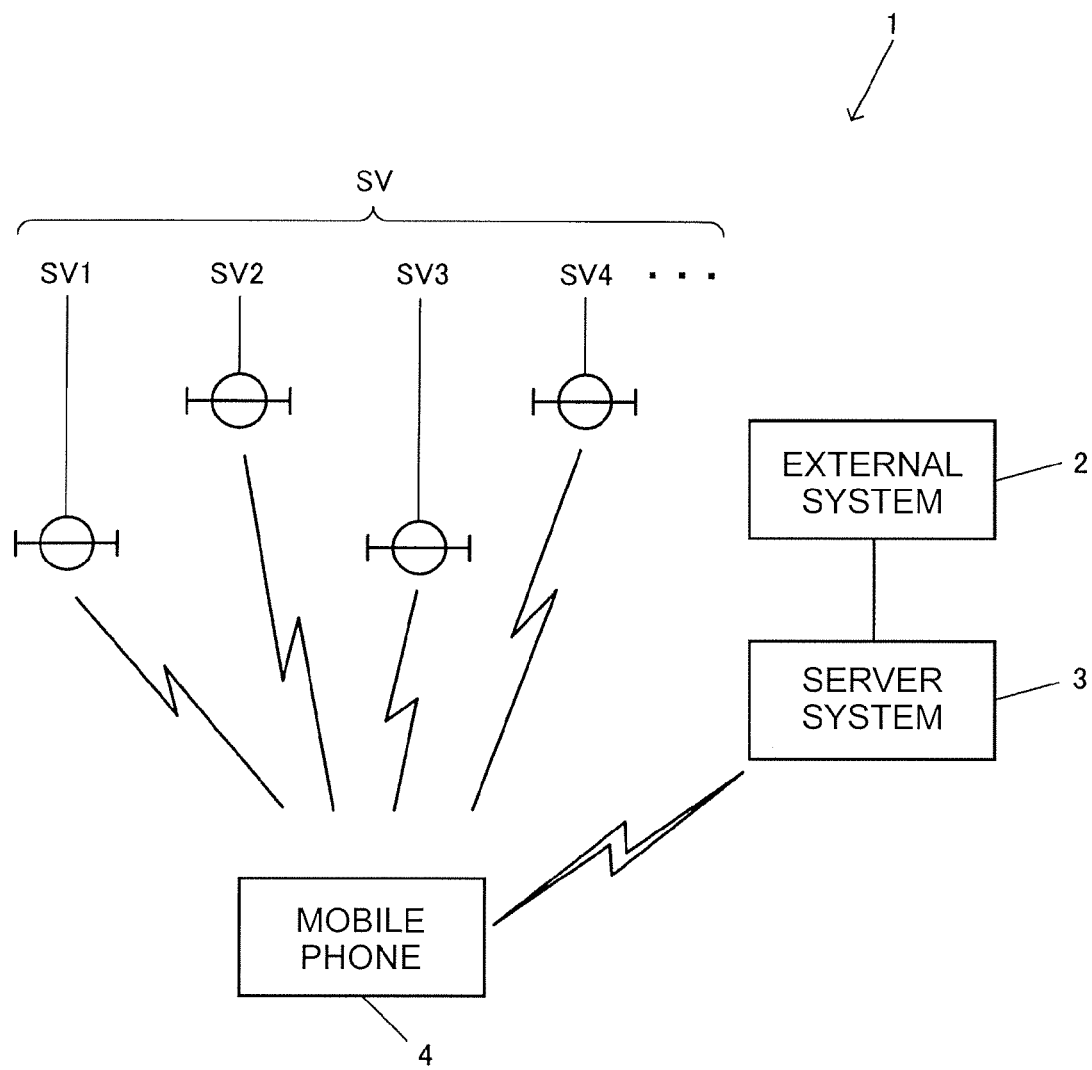
FIG. 1 is a view illustrating the schematic configuration of a positioning system.

FIG. 1 is a view illustrating the schematic configuration of a positioning system 1 in the present embodiment. The positioning system 1 includes an external system 2, a server system 3, a mobile phone 4 which is an electronic apparatus having a positioning device, and a plurality of GPS satellites SV (SV1, SV2, SV3, SV4, . . . ). In addition, since positioning is possible by the mobile phone 4 and the GPS satellite SV after the mobile phone 4 acquires the required data from the server system 2, it can be said that one positioning system is formed by the mobile phone 4 and the GPS satellite SV. In addition, the positioning system includes the server system 3, and the mobile phone 4 may be called a system on the ground side.

The external system 2 is a known system which receives a satellite signal periodically from the GPS satellite SV and which generates the satellite prediction calendar on the basis of the navigation data and the like included in the satellite signal. The external system 2 provides the satellite prediction calendar to the server system 3. The satellite prediction calendar provided by the external system 2 is data of discontinuous positions when arraying the predicted positions, which are obtained by predicting the future positions, in time series at predetermined intervals for each GPS satellite SV. For example, the external system 2 is equivalent to the computer system of a private or public organization which offers the satellite prediction calendar.

The server system 3 is a system including a server which acquires the satellite prediction calendar from the external system 2 and generates and provides the ephemeris (hereinafter, referred to as long-term prediction ephemeris (long-term predicted orbit data) in the present embodiment), which is the predicted ephemeris of all GPS satellites SV and is effective for a long period of time of at least one day, for example, one week, using the satellite prediction calendar.

The mobile phone 4 is an electronic apparatus used when the user performs a call, transmission and reception of e-mails, and the like. The mobile phone 4 includes a positioning device for realizing the function (positioning function) of measuring the position other than the original function as a mobile phone, such as a call or transmission and reception of e-mails. The mobile phone 4 transmits a request signal of the long-term prediction ephemeris to the server system 3 and receives the long-term prediction ephemeris from the server system 3 according to the user's operation. In addition, the mobile phone 4 acquires the GPS satellite SV using the received long-term prediction ephemeris and executes a positioning operation on the basis of the satellite signal.

2. Principles

Figure 2:
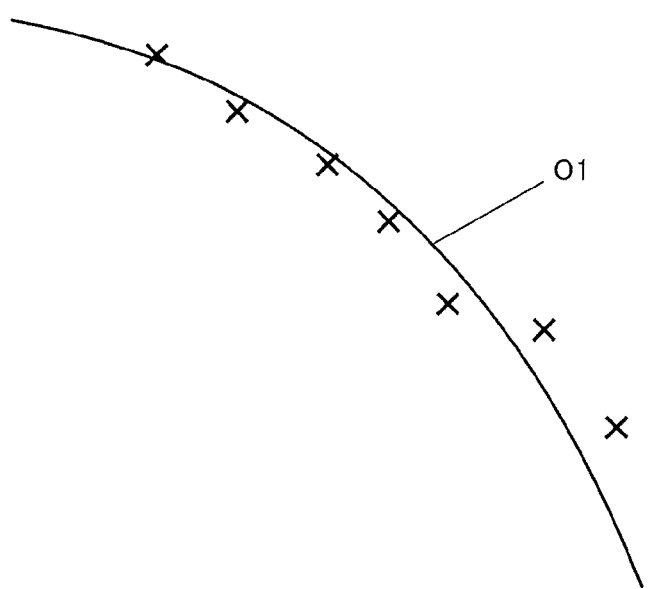
FIG. 2 is a view illustrating an example of the predicted orbit.
Figure 3:
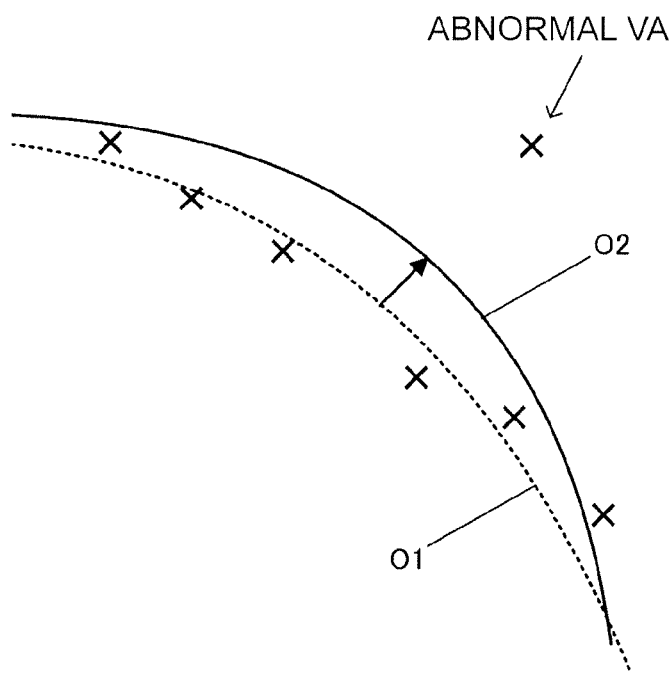
FIG. 3 is a view illustrating an example of the predicted orbit.

FIGS. 2 and 3 are views illustrating examples of the satellite prediction calendar generated by the external system 2 and the satellite orbit calculated on the basis of the satellite prediction calendar. FIG. 2 shows an example of the case where an abnormal value of the predicted position is not included in the satellite prediction calendar and FIG. 3 shows an example of the case where an abnormal value is included. In the present embodiment, among the predicted positions included in the satellite prediction calendar, the predicted position which is extremely distant from an adjacent predicted position in consideration of positional relationship between the adjacent predicted positions is called the abnormal value. In addition, although distance (or difference) between the predicted position which is not the abnormal value and the predicted orbit sampling position, which will be described later, is about from several meters to tens of meters, and the distance between the predicted value of the abnormal value and the predicted orbit sampling position may be several kilometers.

In the present embodiment, Kepler's satellite orbit model (hereinafter, referred to as the approximate model) in which sum of squares of the distances from all the predicted positions stored in the satellite prediction calendar becomes the minimum is calculated using the least square method. The parameter of the approximate model of the satellite orbit calculated at this time is called a satellite orbit parameter, and the calculation for obtaining the approximate model is also called approximate calculation. In addition, the satellite orbit calculated by the approximate calculation is called a predicted orbit.

The approximate model used in the present embodiment is a model expressing an elliptical orbit and does not necessarily pass the predicted position included in the satellite orbit calendar. The predicted orbit is expressed as the function having the time as a variable, and the position of the GPS satellite SV is returned as an output value by giving the time as an input value.

When the abnormal value is not included in the predicted positions included in the satellite prediction calendar, for example, a predicted orbit O1 which is an average orbit for all predicted positions shown in FIG. 2 is acquired. On the other hand, when the abnormal value is included in the predicted positions stored in the satellite prediction calendar, for example, a distorted elliptical predicted orbit O2, a part of which expands in the direction of the abnormal value, shown in FIG. 3 is acquired.

Figure 4:
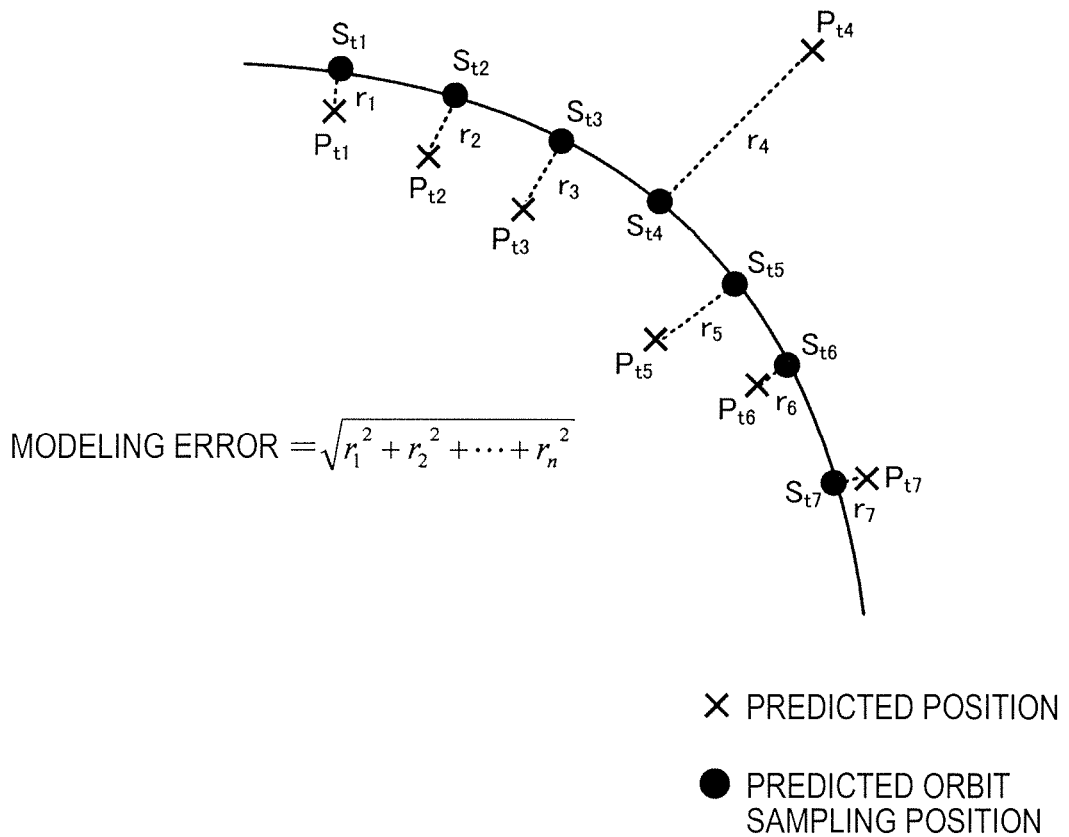
FIG. 4 is a view for explaining the principle of determination on the appropriateness of the satellite orbit.

FIG. 4 is a view for explaining the principle of appropriateness determination on modeling of the predicted orbit. In the present embodiment, an error of modeling of the satellite orbit (hereinafter, referred to as a modeling error) on the basis of the difference between the predicted position included in the satellite prediction calendar and the predicted orbit sampling position (calculated position) calculated from the predicted orbit obtained by approximate calculation is calculated. The predicted position and the predicted orbit sampling position are positions (assumed positions) of the GPS satellite at the same time. For example, they are positions every 15 minutes per hour. The modeling error is calculated on the basis of the difference between the predicted position and the predicted orbit sampling position at the same time, and it is determined whether or not the satellite orbit obtained by approximate calculation is appropriate. More precisely, it is determined whether or not the value of the parameter of the approximate model is appropriate.

Specifically, in the satellite orbit calendar, the predicted positions are stored in time series at predetermined intervals (for example, every 15 minutes). In FIG. 4, the predicted positions $P_{t1}$ to $P_{t7}$ at time t1 to t7 are expressed by x marks. The predicted orbit sampling positions $S_{t1}$ to $S_{t7}$ are acquired by calculating the points at the same time t1 to t7 as the predicted positions from the predicted orbit obtained by the approximate calculation. In FIG. 4, the predicted orbit sampling positions $S_{t1}$ to $S_{t7}$ are expressed by black dots.

Subsequently, the distances $r_1$ to $r_7$ between the predicted positions and the predicted orbit sampling positions are calculated at time t1 to t7. The modeling error is expressed as the square root of sum of squares of all calculated distances, for example. Specifically, when n times (sampling points) exist in all, the modeling error is calculated according to the following expression (1).

$$\text{Modeling error} = \sqrt{r_1^2 + r_2^2 + \ldots + r_n^2} \tag{1}$$

When the modeling error is large, it is assumed that the predicted orbit deviates from the predicted positions on the whole or there is a portion of the predicted orbit which largely deviates from the predicted position. Accordingly, it can be determined that the predicted positions are not appropriately reproduced. On the other hand, when the modeling error is small, it indicates that the predicted orbit is an orbit which passes the neighborhood of the predicted positions or the same positions on the whole. Accordingly, it can be determined that the predicted orbit reproduces the predicted positions appropriately.

Thus, a threshold value determination on the modeling error is performed, and it is determined that modeling of the satellite orbit is appropriate (reproducibility of the predicted position is good) when the modeling error does not reach a predetermined threshold value (for example, 2000 [m]). On the other hand, when the modeling error reaches the predetermined threshold value, it is determined that modeling of the satellite orbit is inappropriate (reproducibility of the predicted positions is not good).

3. Functional Configuration

Figure 5:
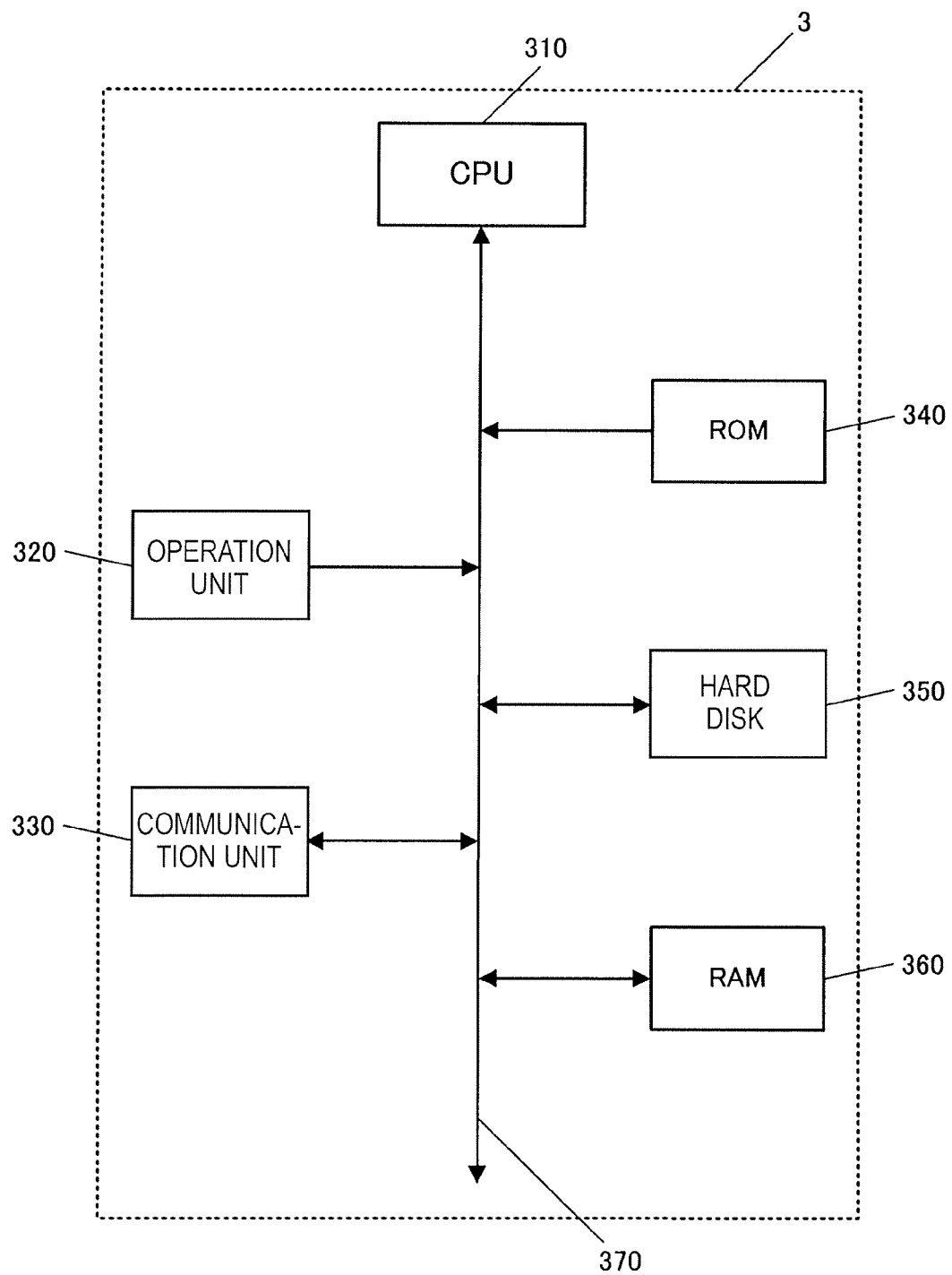
FIG. 5 is a block diagram illustrating the functional configuration of a server system.

FIG. 5 is a block diagram illustrating the functional configuration of the server system 3. The server system 3 is a computer system which includes a CPU (central processing unit) 310, an operation unit 320, a communication unit 330, a ROM (read only memory) 340, a hard disk 350, and a RAM (random access memory) 360 and in which the units are connected to each other by a bus 370.

The CPU 310 is a processor which makes an overall control of the units of the server system 3 according to a system program or the like stored in the ROM 340. In the present embodiment, the CPU 310 performs processing for providing the long-term prediction ephemeris to the mobile phone 4 according to a long-term prediction ephemeris providing program 341 stored in the ROM 340.

The operation unit 320 is an input device which receives an operation instruction from the administrator of the server system 3 and outputs a signal corresponding to the operation to the CPU 310. This function is realized by a keyboard, a button, or a mouse, for example.

The communication unit 330 is a communication device for transmitting and/or receiving various data used in the system to/from the external system 2 or the mobile phone 4 through the communication network, such as the Internet.

The ROM 340 is a read-only nonvolatile storage device and stores various data and programs including a system program required when the CPU 310 controls the server system 3, a program for providing the long-term prediction ephemeris to the mobile phone 4, a program for generating the long-term prediction ephemeris, and a program for calculating the modeling error.

The hard disk 350 is a storage device which performs the reading and writing of data using a magnetic head or the like. Similar to the ROM 340, the hard disk 350 stores programs, data, and the like for realizing various functions of the server system 3.

The RAM 360 is a readable and writable volatile storage device and forms the work area in which the system program executed by the CPU 310, the long-term prediction ephemeris providing program, various processing programs, data being processed in various kinds of processing, a processing result, and the like are temporarily stored.

4. Data Configuration

Figure 6:
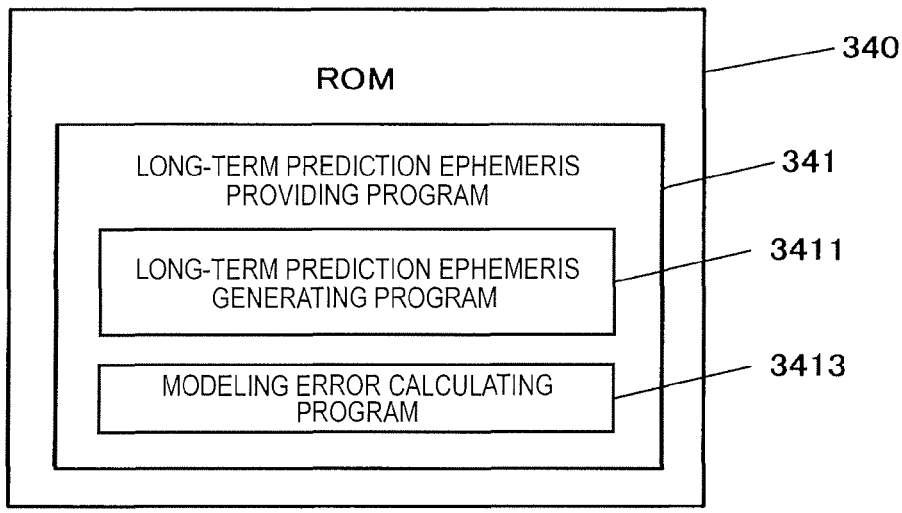
FIG. 6 is a view illustrating an example of data stored in a ROM of the server system.

FIG. 6 is a view illustrating an example of data stored in the ROM 340. The long-term prediction ephemeris providing program 341 which is read by the CPU 310 and which is executed as long-term prediction ephemeris providing processing (refer to FIG. 13) is stored in the ROM 340. In addition, a long-term prediction ephemeris generating program 3411 executed as long-term prediction ephemeris generation processing (refer to FIGS. 14 and 15) and a modeling error calculating program 3413 executed as modeling error calculation processing (refer to FIG. 16) are included as subroutines in the long-term prediction ephemeris providing program 341.

The long-term prediction ephemeris providing processing is processing in which the CPU 310 periodically performs processing for generating long-term prediction ephemeris data 353 and transmits the generated long-term prediction ephemeris data 353 to the mobile phone 4 of the request source when the request signal of the long-term prediction ephemeris data 353 is received from the mobile phone 4.

The long-term prediction ephemeris generation processing is processing in which the CPU 310 generates the long-term prediction ephemeris data 353. In the present embodiment, the CPU 310 generates the long-term prediction ephemeris data 353 once in four hours. Specifically, the CPU 310 sets, as a prediction period, a period until one week after generation date and time of the long-term prediction ephemeris data 353 and generates 28 prediction ephemerides 355 which are obtained by dividing the prediction period every six hours that is a unit period. In addition, the CPU 310 generates the long-term prediction ephemeris data 353 in which the prediction ephemerides 355 corresponding to twenty-eight unit periods are collected.

The modeling error calculation processing is processing in which the CPU 310 calculates the modeling error of the satellite orbit according to the above-described principle. Details of the processing will be described later in detail using a flow chart.

Figure 7:
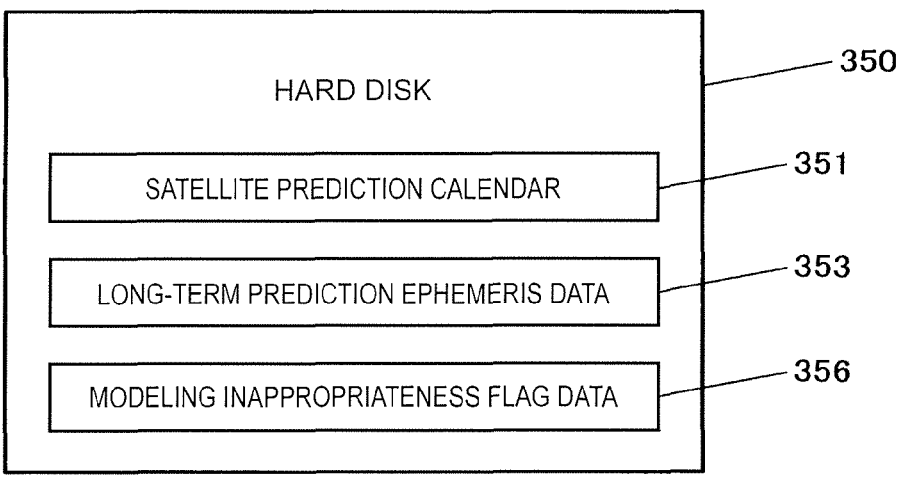
FIG. 7 is a view illustrating an example of the data stored in a hard disk of the server system.

FIG. 7 is a view illustrating an example of the data stored in the hard disk 350. A satellite prediction calendar 351, the long-term prediction ephemeris data 353, and modeling inappropriateness flag data 356 are stored in the hard disk 350.

Figures 9, 10:
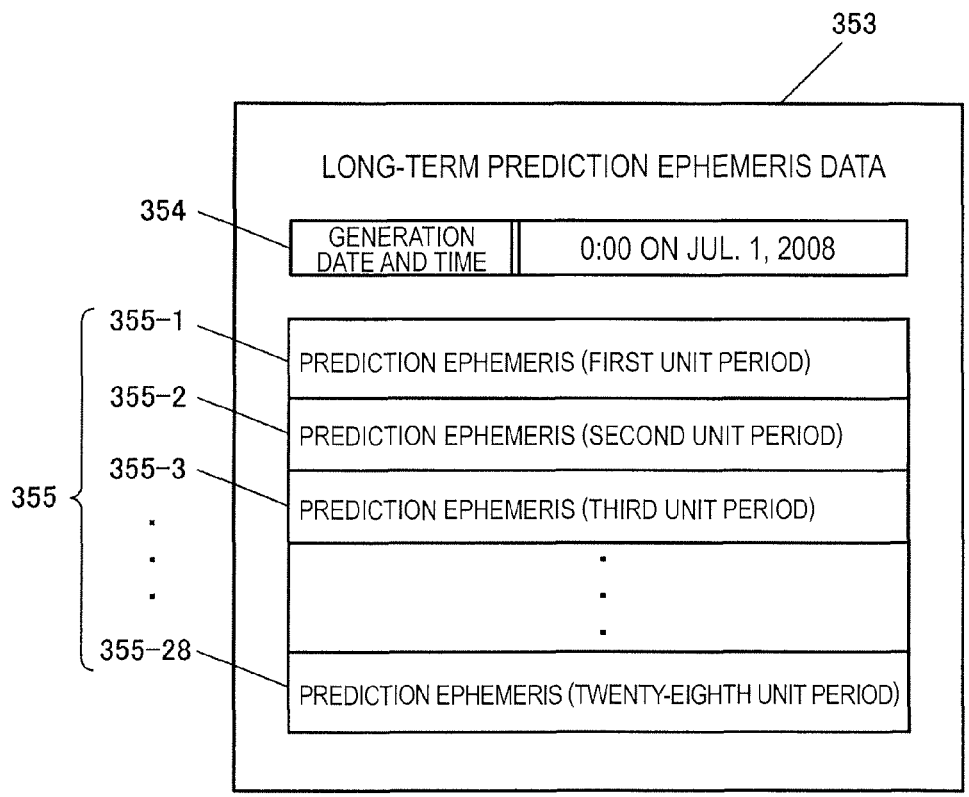
FIG. 9 is a view illustrating an example of the data configuration of a satellite prediction calendar.
FIG. 10 is a view illustrating an example of the data configuration of long-term prediction ephemeris data.

FIG. 9 is a view illustrating an example of the data configuration of the satellite prediction calendar 351. The satellite prediction calendar 351 is discrete data in which the predicted position of each GPS satellite SV until one week after the current day is stored every 15 minutes. The predicted position is expressed as a three-dimensional coordinate value in the earth reference coordinates, for example. For example, the predicted position of the GPS satellite SV2 at 0:30 on Jul. 1, 2008 is (X32, Y32, Z32). The CPU 310 receives the satellite prediction calendar 351 periodically (for example, once in four hours) from the external system 2 and stores and updates it in the hard disk 350.

FIG. 10 is a view illustrating an example of the data configuration of the long-term prediction ephemeris data 353. In the long-term prediction ephemeris data 353, generation date and time 354 of the long-term prediction ephemeris data 353 and prediction ephemeris 355 (355-1 to 355-28) of the first to twenty-eighth unit periods are stored so as to match each other.

Figure 11:
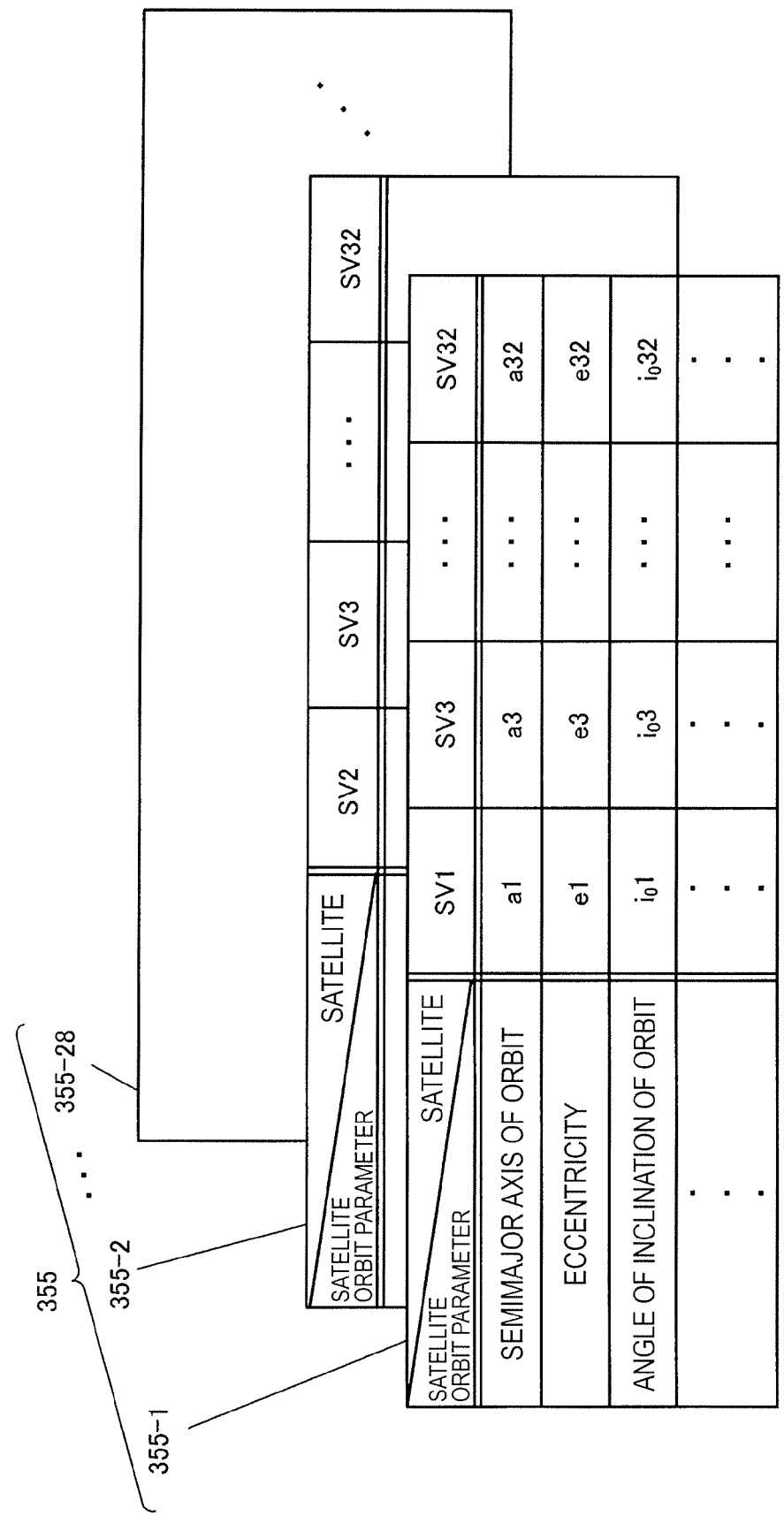
FIG. 11 is a view illustrating an example of the data configuration of prediction ephemeris data.

FIG. 11 is a view illustrating an example of the data configuration of the prediction ephemeris 355. In the prediction ephemeris 355 (355-1 to 355-28), the values of Kepler's satellite orbit parameters, such as the semimajor axis of the orbit, the eccentricity, and the angle of inclination of the orbit are stored for each of the satellites SV1 to SV32.

However, it is characteristic that for each prediction ephemeris of each unit period, values of the satellite orbit parameters are not stored for the GPS satellite SV determined that modeling of the satellite orbit is inappropriate. For example, in the prediction ephemeris 355-1 of the first unit period, it is determined that modeling of the satellite orbit of the GPS satellite SV2 is inappropriate. Accordingly, values of the satellite orbit parameters are not stored for the GPS satellite SV2.

Figure 12:
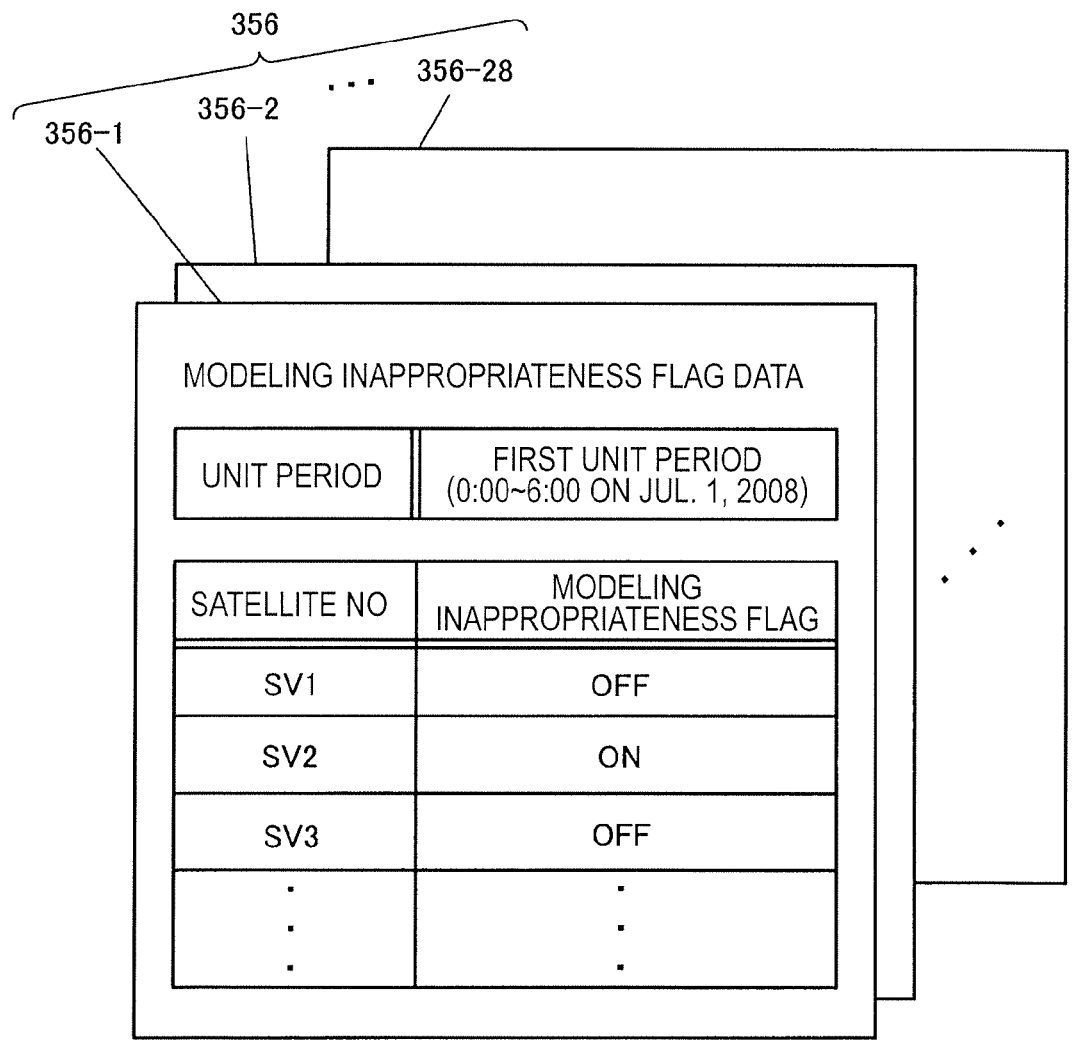
FIG. 12 is a view illustrating an example of the data configuration of a modeling inappropriateness flag data.

FIG. 12 is a view illustrating an example of the data configuration of the modeling inappropriateness flag data 356. In the modeling inappropriateness flag data 356 (356-1, 356-2, . . . , 356-28), the number of the GPS satellite SV and a modeling inappropriateness flag are stored for each unit period so as to match each other.

The modeling inappropriateness flag is a flag which is set to ON for the GPS satellite SV determined that modeling of the satellite orbit is inappropriate and which is set to OFF for the GPS satellite SV determined that modeling of the satellite orbit is appropriate. For example, in the modeling inappropriateness flag data 356-1 of the first unit period of FIG. 12, it is determined that modeling of the satellite orbit of the GPS satellite SV2 is inappropriate. Accordingly, the modeling inappropriateness flag of the GPS satellite SV2 is set to ON.

Figure 8:
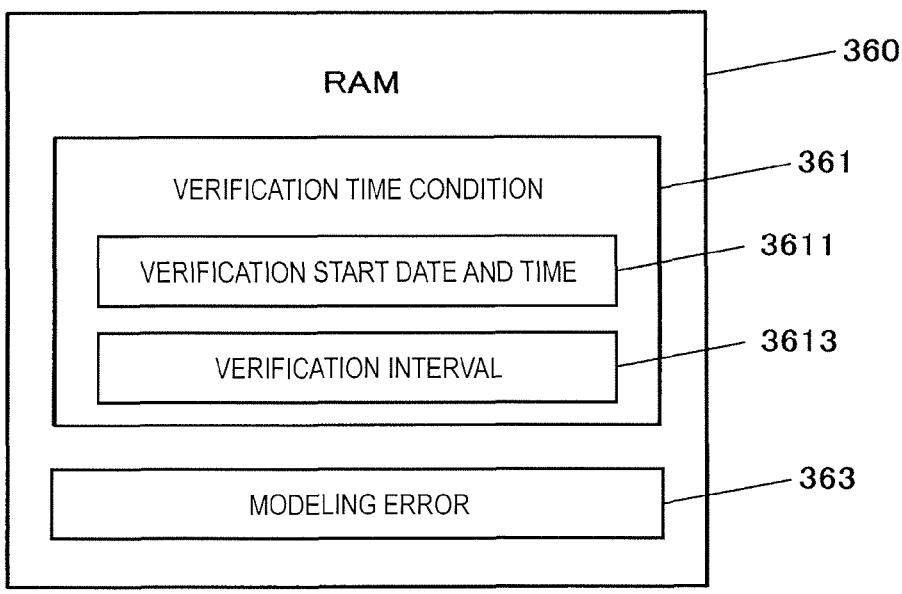
FIG. 8 is a view illustrating an example of the data stored in a RAM of a server system.

FIG. 8 is a view illustrating an example of data stored in the RAM 360. A verification time condition 361 and a modeling error 363 are stored in the RAM 360.

The verification time condition 361 is a condition regarding the time at which it is verified whether or not modeling of the satellite orbit is appropriate. The verification start date and time 3611, at which the verification starts among date and time stored in the satellite prediction calendar 351, and a verification interval 3613, which is an interval at which the verification is performed, are stored in the verification time condition 361. The verification time condition 361 is set variably by the CPU 310 in the long-term prediction ephemeris generation processing.

The modeling error 363 is an error of modeling of the satellite orbit. For example, the modeling error 363 is calculated and stored as the square root of the sum of squares of the distances between the predicted positions and the predicted orbit sampling positions calculated for each verification time.

5. Flow of Processing

Figure 13:
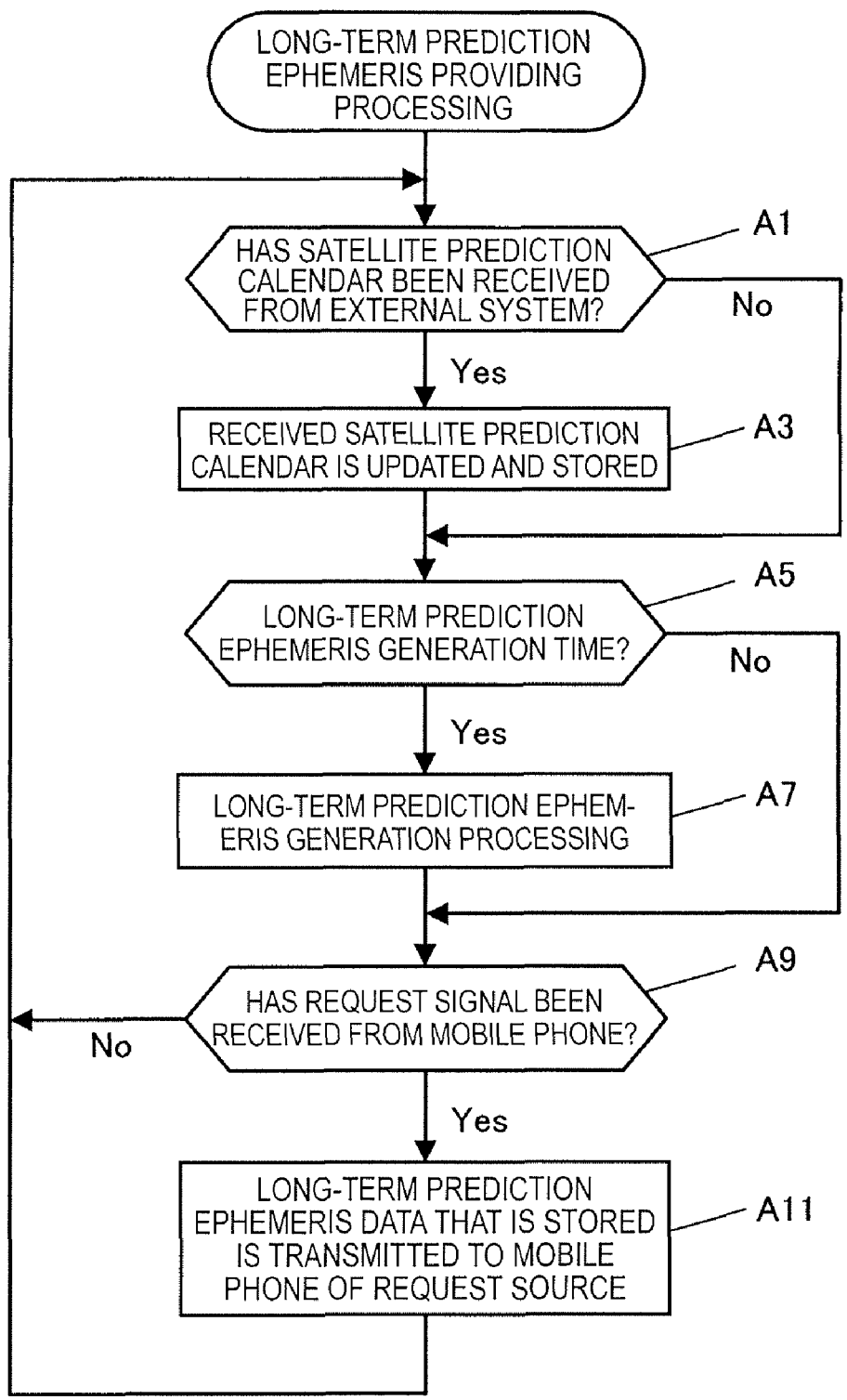
FIG. 13 is a flow chart illustrating a flow of long-teem prediction ephemeris providing processing.

FIG. 13 is a flow chart illustrating the flow of long-term prediction ephemeris providing processing executed in the server system 3 when the long-term prediction ephemeris providing program 341 stored in the ROM 340 is read and executed by the CPU 310.

First, the CPU 310 determines whether or not the satellite prediction calendar 351 has been received from the external system 2 (step A1). When the CPU 310 determines that the satellite prediction calendar 351 has not been received (step A1; No), the process proceeds to step A5. In addition, when the CPU 310 determines that the satellite prediction calendar 351 has been received (step A1; Yes), the CPU 310 updates the received satellite prediction calendar 351 and stores it in the hard disk 350 (step A3).

Then, the CPU 310 determines whether or not it is the generation date and time of long-term prediction ephemeris (step A5). In the present embodiment, it is assumed that the long-term prediction ephemeris is generated once in four hours. Then, if it is determined not to be the generation date and time yet (step A5; No), the CPU 310 moves the processing to step A9.

On the other hand, if it is determined to be the generation date and time of the long-term prediction ephemeris (step A5; Yes), the CPU 310 performs long-term prediction ephemeris generation processing by reading and executing the long-term prediction ephemeris generating program 3411 stored in the ROM 340 (step A7).

Figure 14:
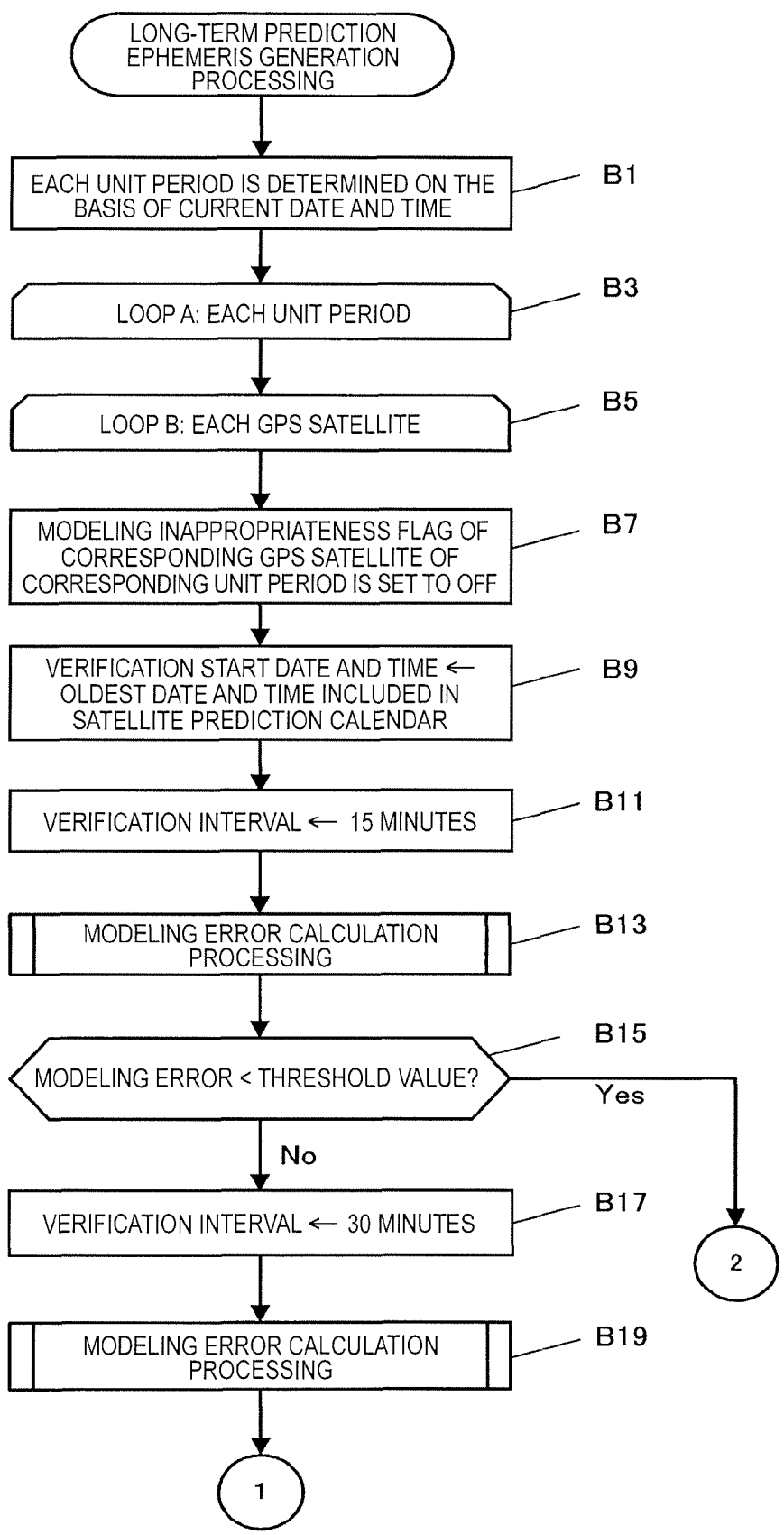
FIG. 14 is a flow chart illustrating the flow of long-term prediction ephemeris providing processing.
Figure 15:
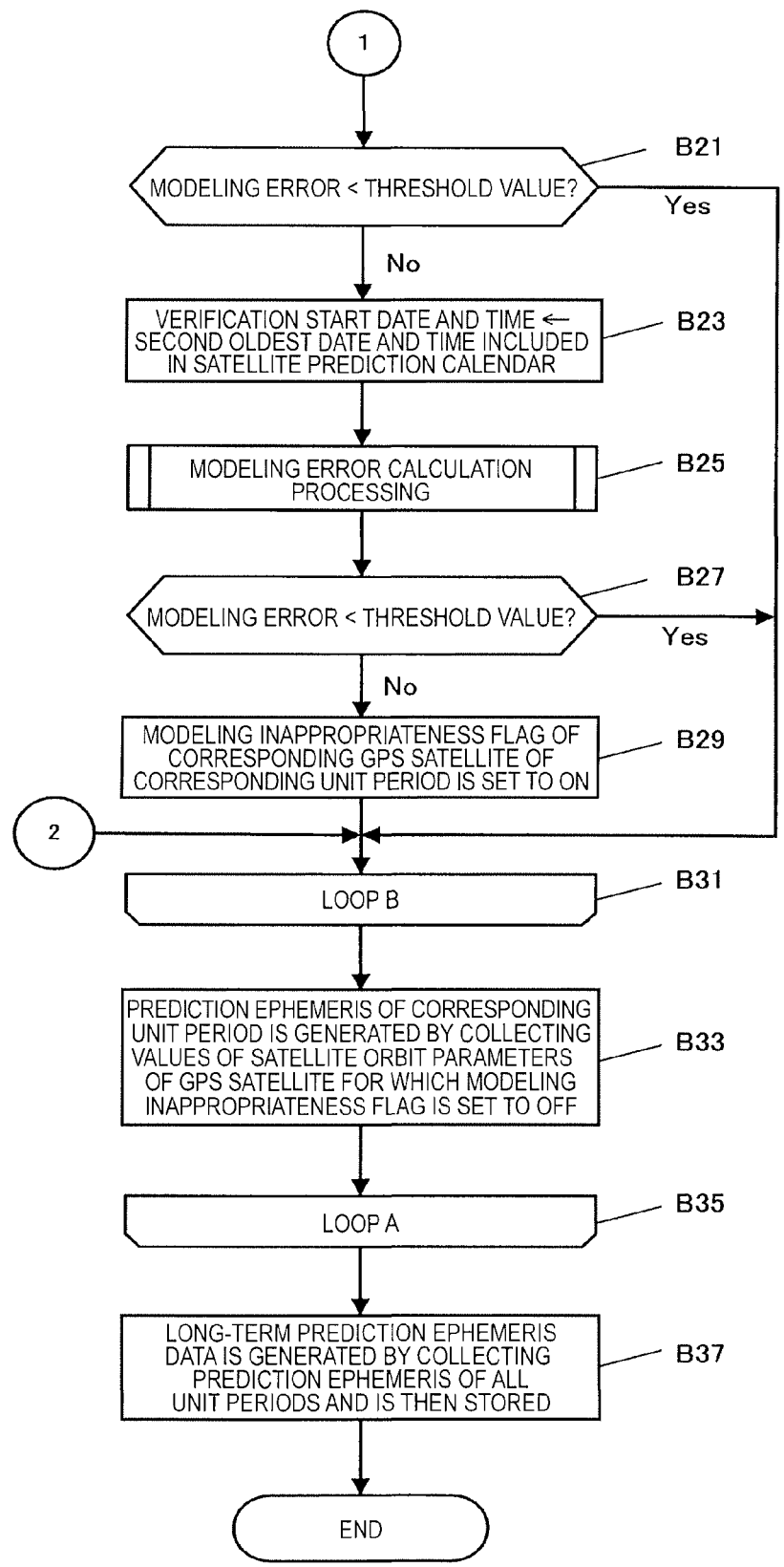
FIG. 15 is a flow chart illustrating the flow of long-term prediction ephemeris providing processing.

FIGS. 14 and 15 are flow charts illustrating the flow of long-term prediction ephemeris generation processing. First, the CPU 310 determines each unit period on the basis of the current date and time (step B1). Specifically, the CPU 310 sets, as a prediction period, a period until one week after the current date and time (generation date and time) and determines each of the periods, which are obtained by dividing the prediction period every six hours, to be a unit period.

Then, the CPU 310 executes processing of loop A for each unit period determined in step B1 (steps B3 to B35). In the processing of loop A, the CPU 310 executes processing of loop B for each GPS satellite SV (steps B5 to B31).

In the processing of loop B, the CPU 310 sets the modeling inappropriateness flag of the corresponding GPS satellite SV of the corresponding unit period in the modeling inappropriateness flag data 356 of the hard disk 350 to OFF (step B7). Then, the CPU 310 sets, as the verification start date and time 3611, oldest date and time included in the satellite prediction calendar 351 stored in the hard disk 350 and stores it as the verification time condition 361 in the RAM 360 (step B9).

In addition, the CPU 310 sets the verification interval 3613 as 15 minutes and stores it as the verification time condition 361 in the RAM 360 (step B11). Then, the CPU 310 performs modeling error calculation processing by reading and executing the modeling error calculating program 3413 stored in the ROM 340 (step B13).

Figure 16:
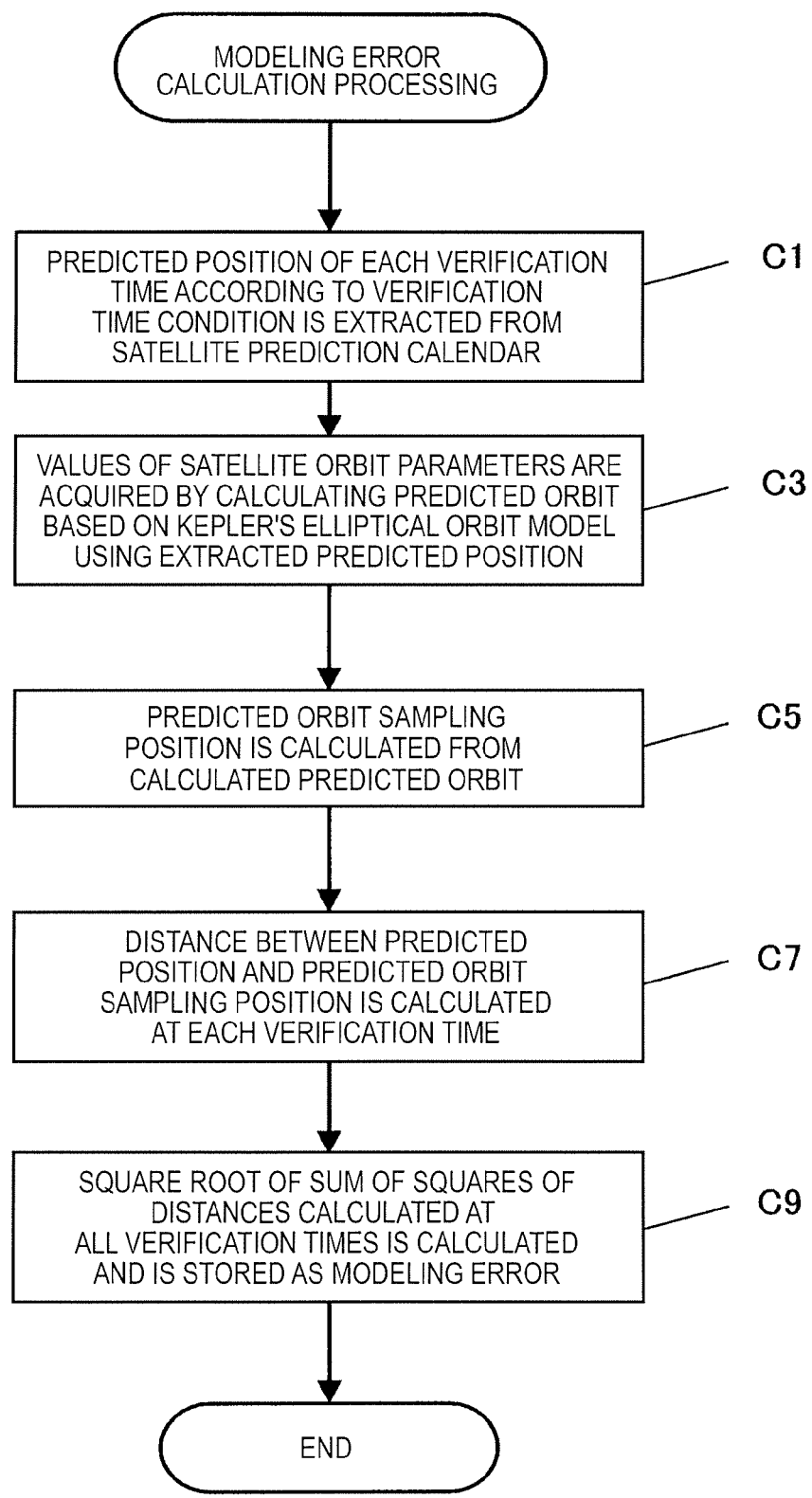
FIG. 16 is a flow chart illustrating a flow of modeling error calculation processing.

FIG. 16 is a flow chart illustrating the flow of modeling error calculation processing. First, the CPU 310 extracts, from the satellite prediction calendar 351 stored in the hard disk 350, the predicted position of each verification time according to the verification time condition 361 stored in the RAM 360 (step C1).

Subsequently, the CPU 310 calculates values of the satellite orbit parameters by calculating the predicted orbit based on the Kepler's elliptical orbit model using the predicted position extracted in step C1 (step C3). Then, the CPU 310 calculates, from the predicted orbit calculated in step C3, the predicted orbit sampling position at the same time as the verification time (step C5).

Then, the CPU 310 calculates the distance between the predicted position and the predicted orbit sampling position at each verification time (step C7). Then, the CPU 310 calculates the square root of sum of squares of the distances calculated at all of the verification times and stores it as the modeling error 363 in the RAM 360 (step C9). Then, the CPU 310 ends the modeling error calculation processing.

After returning to the long-term prediction ephemeris generation processing of FIG. 14 and performing the modeling error calculation processing, the CPU 310 determines whether or not the modeling error 363 stored in the RAM 360 is smaller than a predetermined threshold value (step B15). When it is determined that the modeling error 363 is smaller than the threshold value (step B15; Yes), the CPU 310 moves to the processing for the next GPS satellite SV.

In addition, when it is determined that the modeling error 363 is equal to or larger than the threshold value (step B15; No), the CPU 310 updates the verification interval 3613 stored in the RAM 360 to 30 minutes (step B17). That is, the verification time condition is set to calculate the predicted orbit using the combination of the predicted positions extracted at intervals of 30 minutes without using all predicted positions stored in the satellite prediction calendar 351.

Then, the CPU 310 performs modeling error calculation processing by reading and executing the modeling error calculating program 3413 stored in the ROM 340 (step B19). Then, the CPU 310 determines whether or not the modeling error 363 stored in the RAM 360 is smaller than a predetermined threshold value (step B21). When it is determined that the modeling error 363 is smaller than the threshold value (step B21; Yes), the CPU 310 moves to the processing for the next GPS satellite SV.

In addition, when it is determined that the modeling error 363 is equal to or larger than the threshold value (step B21; No), the CPU 310 updates the verification start date and time 3611 stored in the RAM 360 to second oldest date and time included in the satellite prediction calendar (step B23). That is, when extracting the predicted positions included in the satellite prediction calendar 351 at intervals of 30 minutes, the CPU 310 changes the combination of the predicted positions used for calculation of the predicted orbit by setting the verification time condition so that they are extracted from the second oldest time not from the oldest time.

Then, the CPU 310 performs modeling error calculation processing by reading and executing the modeling error calculating program 3413 stored in the ROM 340 (step B25). Then, the CPU 310 determines whether or not the modeling error 363 stored in the RAM 360 is smaller than a predetermined threshold value (step B27). When it is determined that the modeling error 363 is smaller than the threshold value (step B27; Yes), the CPU 310 moves to the processing for the next GPS satellite SV.

In addition, when it is determined that the modeling error 363 is equal to or larger than the threshold value (step B27; No), the CPU 310 sets the modeling inappropriateness flag of the corresponding GPS satellite SV of the corresponding unit period stored in the modeling inappropriateness flag data 356 of the hard disk 350 to ON (step B29). Then, the CPU 310 moves to the processing for the next GPS satellite SV.

After performing processing of steps B7 to B29 for all GPS satellites SV, the CPU 310 ends the processing of loop B (step B31). Then, the CPU 310 generates the prediction ephemeris 355 of the unit period by collecting the values of the satellite orbit parameters of the GPS satellites SV of which modeling inappropriateness flags in the modeling inappropriateness flag data 356 of the hard disk 350 are set to OFF (step B33). Then, the CPU 310 moves to the processing for the next unit period.

After performing processing of steps B5 to B33 for all unit periods, the CPU 310 ends the processing of loop A (step B35). Then, the CPU 310 collects the prediction ephemeris 355 generated in step B33 for all unit periods, generates the long-term prediction ephemeris data 353 by matching it with the generation date and time 354, and stores it in the hard disk 350 (step B37). Then, the CPU 310 ends the long-term prediction ephemeris generation processing.

After returning to the long-term prediction ephemeris providing processing of FIG. 13 and performing the long-term prediction ephemeris generation processing, the CPU 310 determines whether or not the request signal of the long-term prediction ephemeris has been received from the mobile phone 4 (step A9). Then, when the CPU 310 determines that the request signal has not been received (step A9; No), the process returns to step A1.

In addition, when the CPU 310 determines that the request signal has been received (step A9; Yes), the CPU 310 transmits the long-term prediction ephemeris data 353 stored in the hard disk 350 to the mobile phone 4 of the request source (step A11). Then, the CPU 310 returns to step A1.

6. Operations and Effects

In the positioning system 1, the server system 3 calculates the predicted orbit according to the approximate model for approximating the satellite orbit of the GPS satellite SV on the basis of the satellite prediction calendar which includes the predicted positions of the GPS satellite SV acquired from the external system 2 in time series and calculates the values of the satellite orbit parameters. In addition, the server system 3 calculates the predicted orbit sampling position (calculated position), which is the future position of the GPS satellite SV, using the calculated values of the satellite orbit parameters and determines whether or not modeling of the satellite orbit is appropriate on the basis of the distance between the predicted position and the predicted orbit sampling position.

More specifically, the predicted orbit sampling position at the same time as the predicted position stored in the satellite prediction calendar is calculated from the acquired predicted orbit. In addition, the distance between the predicted position and the predicted orbit sampling position is calculated at each time, and it is determined whether or not the modeling error expressed as the square root of the sum of squares of the distances reaches a predetermined threshold value. Moreover, when the modeling error does not reach the threshold value, it is determined that modeling of the satellite orbit is appropriate. When the modeling error reaches the threshold value, it is determined that modeling of the satellite orbit is inappropriate.

If modeling of the satellite orbit is appropriate, the distance between the predicted position of the GPS satellite SV and the predicted orbit sampling position at the same time should be decreased. Therefore, determination on whether or not modeling of the satellite orbit is appropriate can be effectively performed by threshold value determination on the modeling error calculated from the distance calculated at each time.

In addition, the server system 3 changes the combination of the predicted positions used for calculation of the predicted orbit when it is determined to be inappropriate in the modeling appropriateness determination. In addition, calculation of the predicted orbit, calculation of the predicted orbit sampling position, and modeling appropriateness determination are performed again on the basis of the changed combination of the predicted positions. Thus, when it is determined that modeling of the satellite orbit is not appropriate, the appropriate values of the satellite orbit parameters can be acquired by changing the combination of the predicted positions and performing the modeling again.

Moreover, for each unit period of every six continuous hours, the server system 3 performs calculation of the predicted orbit, calculation of the predicted orbit sampling position, and modeling appropriateness determination for every GPS satellite. Then, the server system 3 provides the mobile phone 4 with long-term prediction ephemeris data in which the unit periods determined to be appropriate in the modeling appropriateness determination and the values of the satellite orbit parameters of the GPS satellite SV are collected. As a result, it becomes possible to provide the mobile phone 4 with only unit periods and values of the satellite orbit parameters of the GPS satellite SV for which modeling was performed appropriately.

7. Modification 7-1. Positioning System

In the above embodiment, the positioning system 1 including the server system 3 and the mobile phone 4 was described as an example. However, a positioning system to which the invention can be applied is not limited to the positioning system 1. For example, the invention may also be applied to electronic apparatuses, such as a notebook computer including a positioning device, a PDA (personal digital assistant) including a positioning device, and a car navigation apparatus that includes a positioning device, instead of the mobile phone 4.

7-2. Satellite Positioning System

In addition, the explanation has been made using the GPS as an example of the satellite positioning system. However, other satellite positioning systems, such as a WAAS (wide area augmentation system), a QZSS (quasi zenith satellite system), a GLONASS (global navigation satellite system), and a GALILEO may also be used.

7-3. Long-Term Prediction Ephemeris Data Generation Processing

Figure 17:
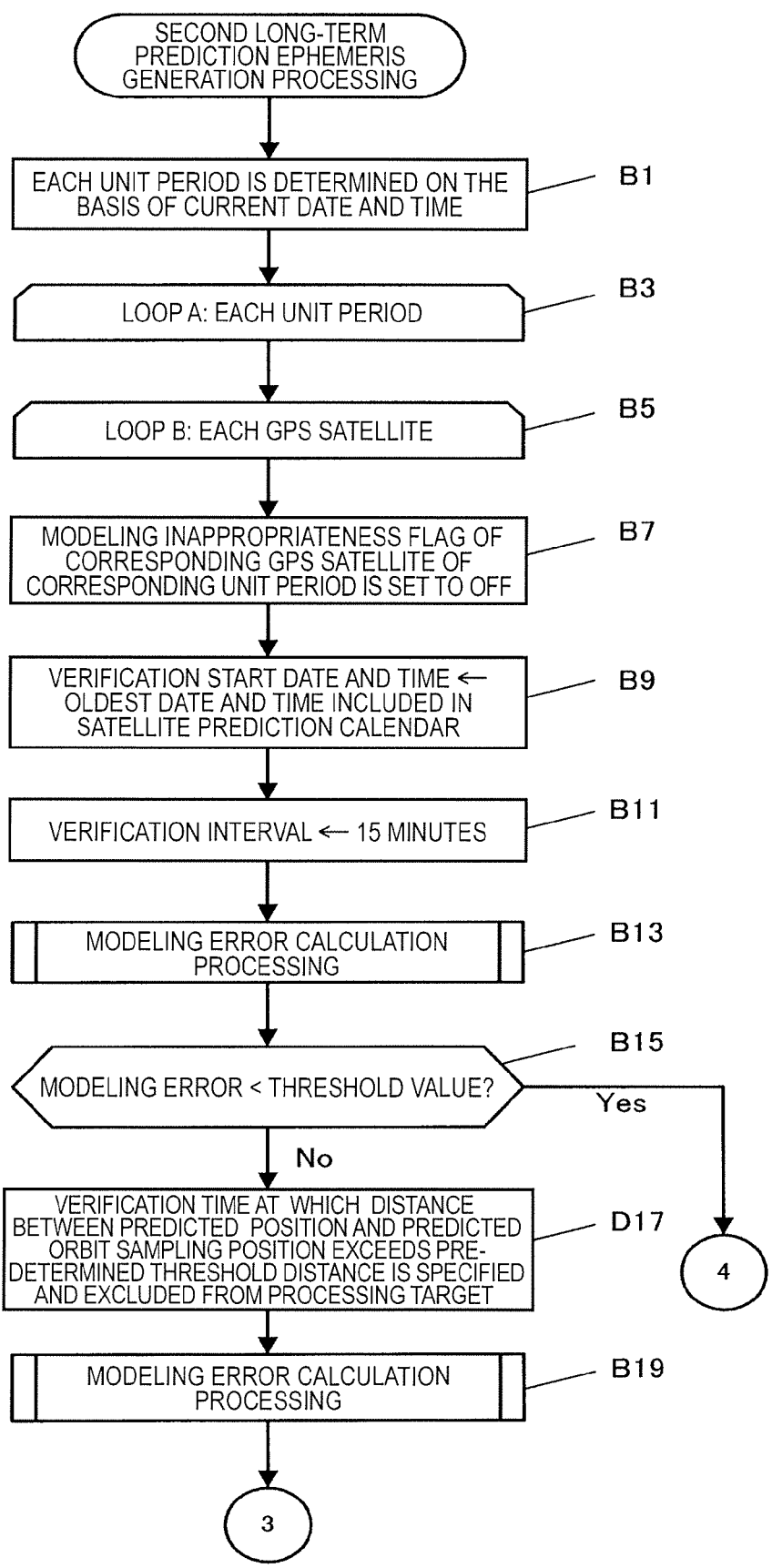
FIG. 17 is a flow chart illustrating a flow of second long-term prediction ephemeris generation processing.
Figure 18:
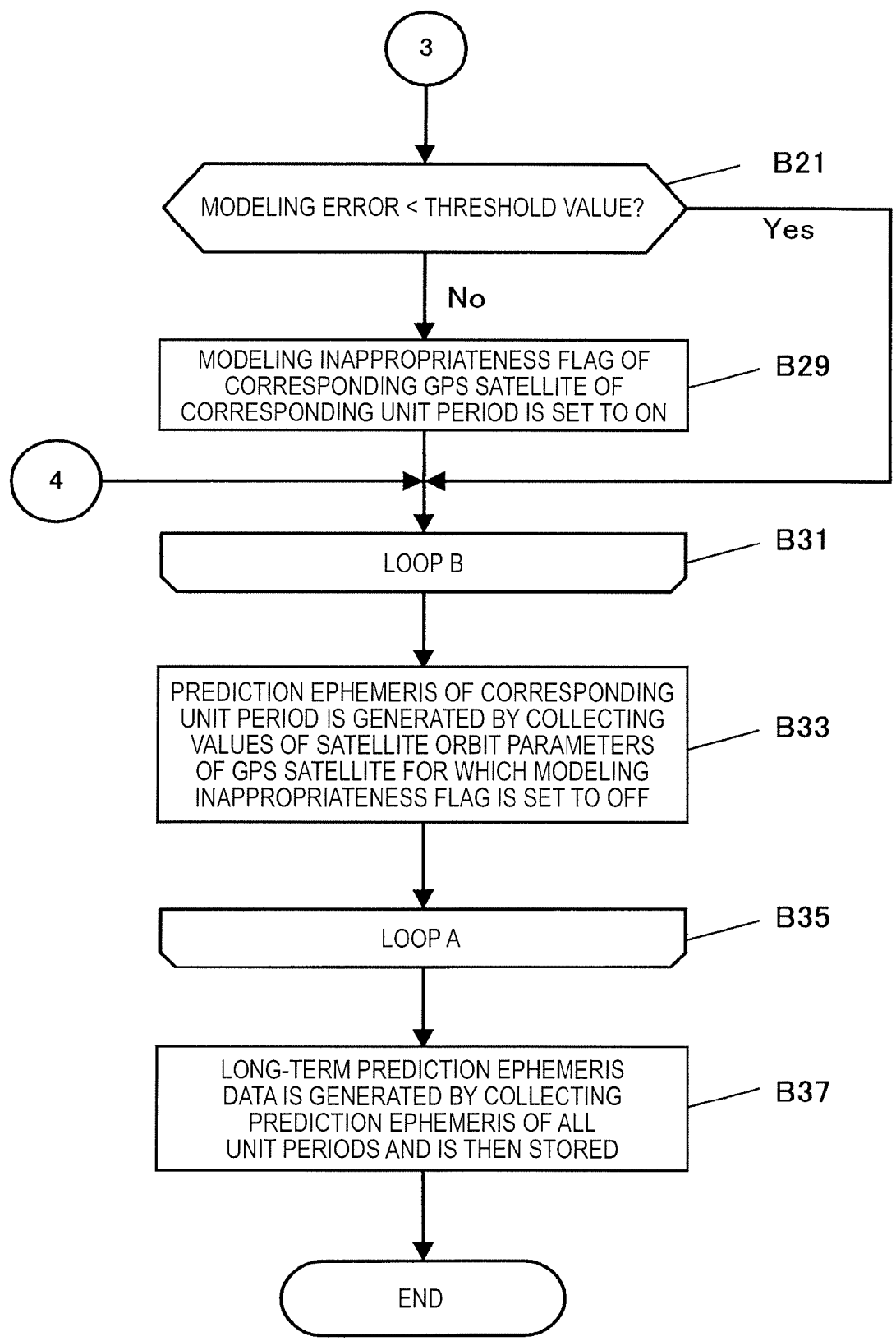
FIG. 18 is a flow chart illustrating the flow of second long-term prediction ephemeris generation processing.

FIGS. 17 and 18 are flow charts illustrating the flow of second long-term prediction ephemeris generation processing which is processing related to generation of long-term prediction ephemeris data in a modification. The second long-term prediction ephemeris generation processing is processing of generating long-term prediction ephemeris data by performing modeling of the satellite orbit again using the remaining predicted positions excluding the predicted position, which is considered to be an abnormal value, when it is determined that modeling of the satellite orbit is inappropriate. In addition, the same steps as in the long-term prediction ephemeris generation processing of FIGS. 14 and 15 are denoted by the same reference numerals, and the explanation will be omitted. Here, an explanation will be focused on a portion different from the long-term prediction ephemeris generation processing.

In the second long-term prediction ephemeris generation processing, when it is determined that a modeling error is equal to or larger than a threshold value in step B15 (step B15; No), the CPU 310 specifies the verification time at which the distance between the predicted position and the predicted orbit sampling position calculated in step C7 of the modeling error calculation processing exceeds the predetermined threshold distance (for example, 500 [m]) and excludes it from the processing target of modeling error calculation processing (step D17). Then, the CPU 310 performs modeling error calculation processing (step B19).

For the verification time when the distance between the predicted position and the predicted orbit sampling position becomes extremely large, there is a high possibility that the predicted position will be an abnormal value. For this reason, the predicted position at which the distance between the predicted position and the predicted orbit sampling position exceeds the predetermined threshold distance is considered to be an abnormal value and is accordingly excluded, and modeling of the satellite orbit is performed again using the remaining predicted positions.

Then, the CPU 310 determines whether or not the modeling error is smaller than the threshold value (step B21). When it is determined that the modeling error is smaller than the threshold value (step B21; Yes), the CPU 310 moves to the processing for the next GPS satellite SV. In addition, when it is determined that the modeling error is equal to or larger than the threshold value (step B21; No), the CPU 310 sets the modeling inappropriateness flag of the corresponding GPS satellite SV of the corresponding unit period (step B29) to ON and moves to the processing for the next GPS satellite SV.

Figure 19:
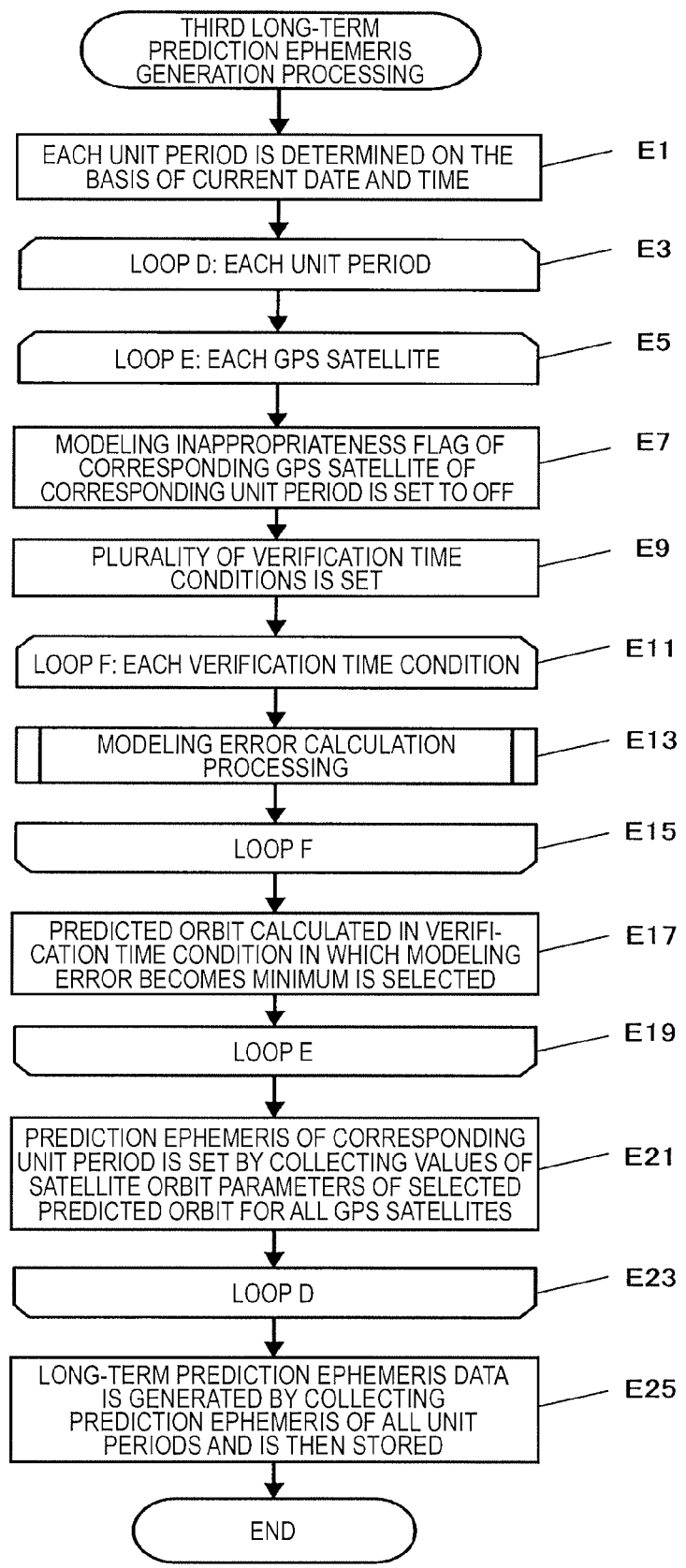
FIG. 19 is a flow chart illustrating the flow of third long-term prediction ephemeris generation processing.

FIG. 19 is a flow chart illustrating the flow of third long-term prediction ephemeris generation processing which is processing related to generation of other long-term prediction ephemeris data. The third long-term prediction ephemeris generation processing is processing in which modeling of the satellite orbit is performed in a plurality of verification time conditions and the long-term prediction ephemeris data is generated using the model of the satellite orbit in the verification time condition where the modeling error becomes the minimum.

First, the CPU 310 determines each unit period on the basis of the current date and time (step E1). Then, the CPU 310 executes processing of loop D in each unit period determined in step E1 (steps E3 to E23).

In the processing of loop D, the CPU 310 executes processing of loop E for each GPS satellite SV (steps E5 to E19). In the processing of loop E, the CPU 310 sets the modeling inappropriateness flag of the corresponding GPS satellite SV of the corresponding unit period in the modeling inappropriateness flag data 356 of the hard disk 350 (step E7) to OFF.

Then, the CPU 310 sets a plurality of verification time conditions (step E9). For example, three kinds of verification time conditions including (1) verification start date and time are oldest date and time in the satellite prediction calendar and the verification interval is 15 minutes, (2) verification start date and time are oldest date and time in the satellite prediction calendar and the verification interval is 30 minutes, and (3) verification start date and time are second oldest date and time in the satellite prediction calendar and the verification interval is 30 minutes. In addition, the kinds or number of set verification time conditions may be appropriately set and changed.

Then, the CPU 310 executes processing of loop F in each verification time condition set in step E9 (steps E11 to E15). In the processing of loop F, the CPU 310 performs modeling error calculation processing in the verification time condition (step E13). Then, the CPU 310 moves to the processing for the next verification time condition.

After performing the processing of step E13 in all verification time conditions, the CPU 310 ends the processing of loop F (step E15). Then, the CPU 310 selects the predicted orbit calculated in the verification time condition in which the modeling error becomes the minimum (step E17). Then, the CPU 310 moves to the processing for the next GPS satellite SV.

After performing the processing of steps E7 to E17 in all GPS satellites SV, the CPU 310 ends the processing of loop E (step E19). Subsequently, the CPU 310 sets the prediction ephemeris of the corresponding unit period by collecting the values of the satellite orbit parameters of the predicted orbit selected in step E11 for all of the GPS satellites SV (step E21). Then, the CPU 310 moves to the processing for the next unit period.

After performing the processing of steps E5 to E21 for all unit periods, the CPU 310 ends the processing of loop D (step E23). Then, the CPU 310 collects the prediction ephemeris for all unit periods, generates the long-term prediction ephemeris data, and stores it in the hard disk 350 (step E25). Then, the CPU 310 ends the third long-term prediction ephemeris generation processing.

7-4. Data Configuration of Long-Term Prediction Ephemeris Data

Figure 20:
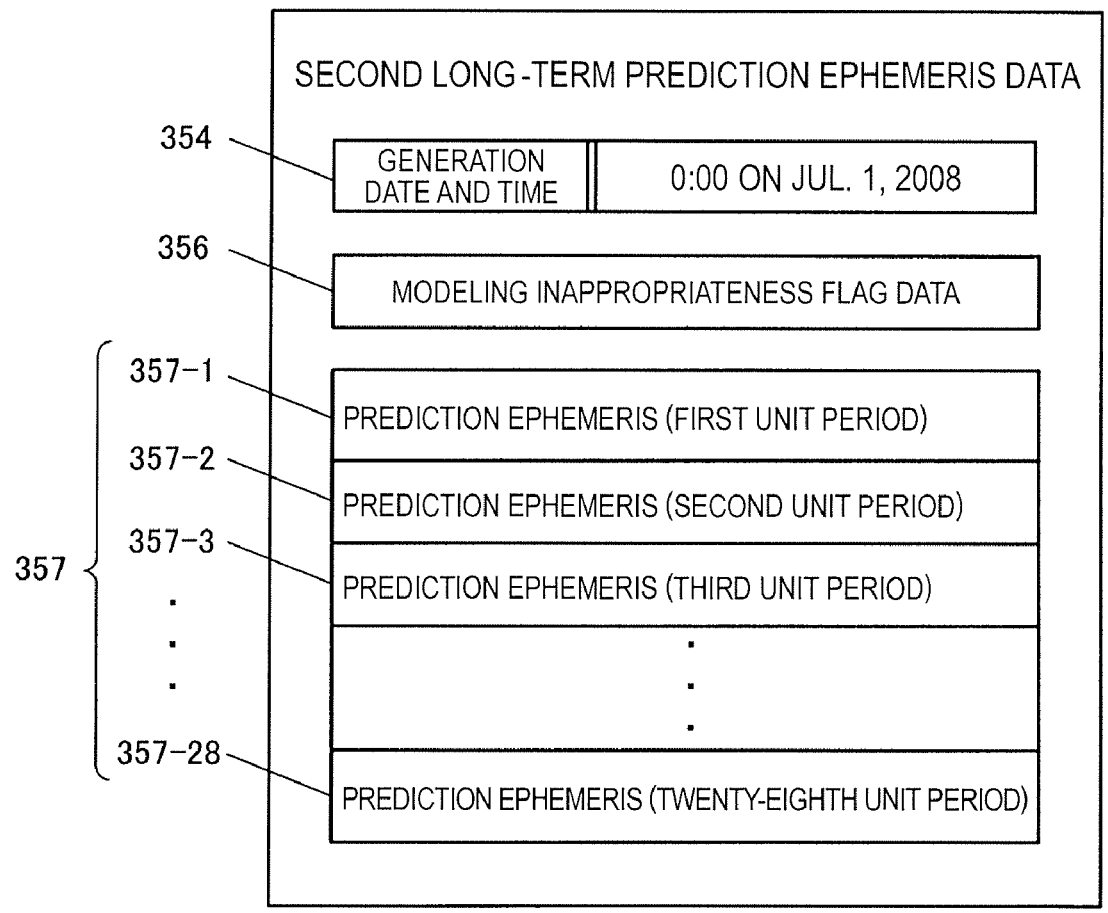
FIG. 20 is a view illustrating an example of the data configuration of second long-term prediction ephemeris data.

The data configuration of long-term prediction ephemeris data provided to the mobile phone 4 may be set as follows. That is, as shown in FIG. 20, second long-term prediction ephemeris data matched with the generation date and time 354, the modeling inappropriateness flag data 356, and prediction ephemeris 357 (357-1, 357-2, . . . , 357-28) of the first to twenty-eighth unit periods is provided to the mobile phone 4.

The values of the satellite orbit parameters for all of the GPS satellites SV are stored in the prediction ephemeris 357 (357-1, 357-2, . . . , 357-28). The mobile phone 4 can specify the unit period and the GPS satellite SV, which are determined that modeling is inappropriate by the server system 3, by referring to the modeling inappropriateness flag data 356 stored in the received second long-term prediction ephemeris data. In addition, it is possible to prevent the decrease in accuracy of the positioning by making the values of the satellite orbit parameters stored in the prediction ephemeris 357 not used for positioning for the GPS satellite SV of the specified unit period.

7-5. Modeling Error

In the above embodiment, the square root of the sum of squares of the distances between the predicted positions and the predicted orbit sampling positions calculated for each verification time is set as the modeling error. However, for example, the maximum value or average value of the distances between the predicted positions and the predicted orbit sampling positions may be set as the modeling error.

In addition, it may be possible to calculate the modeling error by calculating the distances between the predicted positions and the predicted orbit sampling positions for all times rather than calculating the modeling error by calculating the distance between the predicted position and the predicted orbit sampling position for every verification time. For example, in the embodiment described above, when the verification interval is 30 minutes, the modeling error is calculated by calculating the distance between the predicted position and the predicted orbit sampling position at each verification time for every 30 minutes. However, the modeling error may be calculated by calculating the distance between the predicted position and the predicted orbit sampling position at each time for every 15 minutes which is the interval stored in the satellite prediction calendar.

7-6. Generation and Provision of Long-Term Prediction Ephemeris Data

In the embodiment described above, the server system 3 generates long-term prediction ephemeris data at predetermined intervals (for example, once in four hours) beforehand, and the long-term prediction ephemeris data is transmitted when the request of the long-term prediction ephemeris data is received from the mobile phone 4. However, it may be possible to generate long-term prediction ephemeris data when the request of the long-term prediction ephemeris data is received from the mobile phone 4 and to transmit it to the mobile phone 4 rather than adopting the above-described configuration.

7-7. Prediction Period

In the embodiment described above, the long-term prediction ephemeris data is generated in a state where the period until one week after generation date and time of the long-term prediction ephemeris data is set as the prediction period. However, the prediction period may be a period (for example, two weeks) longer than one week or may be a period (for example, three days) shorter than one week. Although the effective period of the ephemeris as navigation data transmitted from the GPS satellite is generally about four hours, it is preferable that the effective period of the long-term prediction ephemeris data is longer than at least that of the ephemeris as navigation data transmitted from the GPS satellite. Preferably, the effective period is one day or more.

7-8. Unit Period

Moreover, the unit period is formed by dividing the prediction period of the long-term prediction ephemeris data every six hours. However, for example, the unit period may be formed by dividing the prediction period of the long-term prediction ephemeris data every four hours, and the length of the unit period may be changed appropriately.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents

What is claimed is:

1. A method for determining the appropriateness of satellite orbit modeling using a predetermined model, the method comprising:
   calculating values of parameters, that the predetermined model has, on the basis of predicted position data including a first predicted position at a first point of time and a second predicted position at a second point of time of a positioning satellite in time series, the predetermined model being used when approximating a satellite orbit of the positioning satellite;
   calculating a first and a second calculated positions of the positioning satellite derived from the predetermined model by using the values of the parameters; and
   determining the appropriateness of the predetermined model using the values of the parameters, on the basis of first difference between the first predicted position and the first calculated position, and seconded difference between the second predicted position and the second calculated position.

2. The method for determining the appropriateness of the satellite orbit modeling according to claim 1, wherein
   the predetermined model is for obtaining a position of the satellite by inputting a time,
   the calculating the first and the second calculated positions includes calculating the first calculated position at the first point of time and the second calculated position at the second point of time, and
   the determining the appropriateness of the modeling includes determining the appropriateness of the predetermined model on the basis of the first difference between the first predicted position and the first calculated position and the second difference between the second predicted position and the second calculated position.

3. The method for determining the appropriateness of satellite orbit modeling according to claim 2, further comprising
   selecting the first predicted position, if the first difference is within a predetermined value,
   selecting the second predicted position, if the second difference is within the predetermined value,
   calculating the values of the parameters on the basis of at least one of the first and second predicted positions after being selected,
   calculating at least one of the first and second calculated positions on the basis of at least one of the first and second predicted positions after being selected, and
   determining the appropriateness of the predetermined model on the basis of at least one of the first and second predicted positions after being selected.

4. The method for determining the appropriateness of the satellite orbit modeling according to claim 1, further comprising
   selecting a first combination from the first and second predicted positions from the predicted position data,
   calculating the values of the parameters on the basis of the combination after being selected,
   calculating the first and second calculated positions on the basis of the combination after being selected, and
   determining the appropriateness of the predetermined model on the basis of the combination after being selected.

5. The method for determining the appropriateness of the satellite orbit modeling according to claim 4, further comprising
   selecting a second combination from the first predicted position, the second predicted position, and a third predicted position, when the predetermined model is determined to be not appropriate,
   calculating the values of the parameters on the basis of the second combination after being selected,
   calculation of the first calculated position, the second calculated position, and a third calculated position on the basis of the second combination, and
   determining appropriateness of the predetermined model on the basis of the second combination.

6. A method of providing long-term predicted orbit data, comprising:
   calculating values of parameters, that the predetermined model has, on the basis of predicted position data including a first predicted position at a first point of time and a second predicted position at a second point of time of a positioning satellite in time series, the predetermined model being used when approximating a satellite orbit of the positioning satellite;
   calculating a first and a second calculated positions of the positioning satellite derived from the predetermined model by using the values of the parameters;
   determining the appropriateness of the predetermined model using the values of the parameters for each of two consecutive unit periods of time, on the basis of first difference between the first predicted position and the first calculated position, and seconded difference between the second predicted position and the second calculated position; and
   providing long-term predicted orbit data which include the parameters, if the predetermined model for each of the two consecutive unit periods of time is determined to be appropriate.

7. A method of providing long-term predicted orbit data, comprising:
   calculating values of parameters, that the predetermined model has, on the basis of predicted position data including a first predicted position at a first point of time and a second predicted position at a second point of time of a positioning satellite in time series, the predetermined model being used when approximating a satellite orbit of the positioning satellite;
   calculating a first and a second calculated positions of the positioning satellite derived from the predetermined model by using the values of the parameters;

determining the appropriateness of the predetermined model using the values of the parameters for two consecutive unit periods of time, on the basis of first difference between the first predicted position and the first calculated position, and seconded difference between the second predicted position and the second calculated position; and providing long-term predicted orbit data which include the parameters, if the predetermined model for the two consecutive unit periods of time is determined to be appropriate.

8. A device for determining the appropriateness of satellite orbit modeling, comprising:

a parameter value calculating unit being configured to calculate values of parameters, that the predetermined model has, on the basis of predicted position data including a first predicted position at a first point of time and a second predicted position at a second point of time of a positioning satellite in time series, the predetermined model being used when approximating a satellite orbit of the positioning satellite;

a calculated position calculating unit being configured to calculate a first and a second calculated positions of the positioning satellite derived from the predetermined model by using the values of the parameters; and a determination unit being configured to determine the appropriateness of the predetermined model using the values of the parameters, on the basis of first difference between the first predicted position and the first calculated position, and seconded difference between the second predicted position and the second calculated position.

* * * * *